United States Patent [19]
Janik et al.

[11] Patent Number: 6,163,839
[45] Date of Patent: Dec. 19, 2000

[54] NON-STALLING CIRCULAR COUNTERFLOW PIPELINE PROCESSOR WITH REORDER BUFFER

[75] Inventors: Kenneth J. Janik, Hillsboro; Shih-Lien L. Lu, Corvallis; Michael F. Miller, Hillsboro, all of Oreg.

[73] Assignee: Intel Corporation, Santa Clara, Calif.

[21] Appl. No.: 09/164,016

[22] Filed: Sep. 30, 1998

[51] Int. Cl.$^7$ .................................................. G06F 15/00
[52] U.S. Cl. .......................... 712/219; 712/218; 712/42
[58] Field of Search .............................. 712/41, 218, 200, 712/217, 212, 214, 219, 42, 216, 205

[56] References Cited

U.S. PATENT DOCUMENTS

| | | | |
|---|---|---|---|
| 4,658,355 | 4/1987 | Hatakeyama et al. | 712/4 |
| 5,572,690 | 11/1996 | Molnar et al. | 712/200 |
| 5,600,848 | 2/1997 | Sproull et al. | 712/42 |
| 5,682,493 | 10/1997 | Yung et al. | 712/217 |
| 5,704,054 | 12/1997 | Bhattacharya | 712/212 |
| 5,758,139 | 5/1998 | Sutherland et al. | 713/600 |
| 5,805,838 | 9/1998 | Sutherland et al. | 710/112 |
| 5,838,939 | 11/1998 | Sutherland | 712/200 |
| 5,943,491 | 8/1999 | Sutherland et al. | 709/400 |

OTHER PUBLICATIONS

Werner; Asynchronous Processor Survey; Nov. 1997; IEEE; pp. 67–76.

Werner et al.; Counterflow Pipeline Based Dynamic Instruction Scheduling; IEEE; pp. 69–79.

Bhandarkar, D., et al., "Performance Characterization of the Pentium Pro Processor", Proceedings of the Third International Symposium on High–Performance Computer Architecture, San Antonio, TX, pp. 288–297, (Feb. 1–5, 1997).

Burger, D., et al., "The SimpleScalar Tool Set, Version 2.0", *University of Wisconsin–Madison Computer Sciences Department Technical Report #1342*, pp. 1–21, (Jun. 1997).

Carlson, R., et al., "VRP Simulator", http://www.ece.orst.edu/~sllu/cfpp/vrpsim/docs/vrpsim.html, (12 p.), Apr. 1996.

Childers, B.R., et al., "A Design Environment for Counterflow Pipeline Synthesis", ACM Sigplan Workshop Proceedings on Languages, Compilers, and Tools for Embedded Systems, Montreal, Canada, pp. 223–234, (June 19–20, 1998).

Childers, B.R., et al., "Application–Specific Pipelines for Exploiting Instruction–Level Parallelism", *University of Virginia Computer Science Technical Report No. CS–98–14*, 10 p., (May 1, 1998).

Childers, B.R., et al., "Automatic Counterflow Pipeline Synthesis", *University of Virginia Computer Science Technical Report No. CS–98–01*, 6 p., (Jan. 1998).

Childers, B.R., et al., "Synthesis of Application–Specific Counterflow Pipelines", *Department of Computer Science Slides of the Workshop on the Interaction between Compilers and Computer Architecture*, San Jose, CA, 5 p., (Feb. 4, 1996).

Janik, K.J., et al., "Advances of the Counterflow Pipeline Microarchitecture", IEEE Computer Soc. Press—Proceedings of the Third International Symposium on High–Performance Computer Architecture, 7 p., (1997).

(List continued on next page.)

*Primary Examiner*—Larry D. Donaghue
*Attorney, Agent, or Firm*—Schwegman, Lundberg, Woessner & Kluth, P.A.

[57] ABSTRACT

A system and method of executing instructions within a counterflow pipeline processor. The counterflow pipeline processor includes an instruction pipeline, a data pipeline, a reorder buffer and a plurality of execution units. An instruction and one or more operands issue into the instruction pipeline and a determination is made at one of the execution units whether the instruction is ready for execution. If so, the operands are loaded into the execution unit and the instruction executes. The execution unit is monitored for a result and, when the result arrives, it is stored into the result pipeline. If the instruction reaches the end of the pipeline without executing it wraps around and is sent down the instruction pipeline again.

38 Claims, 19 Drawing Sheets

OTHER PUBLICATIONS

Jones, M.D., "A New Approach to Microprocessors", http://lal.cs.byu.edu/people/jones/latex/sproull.html/sproull.html, pp. 1–17, (1994).

Jones, M.D., "Future Computer Plumbing", *Insight,* 10 (1), pp. 50–61, (1994).

Josephs, M.B., et al., "Formal design of an asynchronous DSP counterflow pipeline: a case study in Handshake Algebra", Proceedings of the International Symposium on Advanced Research in Asynchronous Circuits and Systems, Salt Lake City, Utah, pp. 206–215, (Nov. 3–5, 1994).

Lo, J.L., et al., "Converting Thread–Level Parallelism to Instruction–Level Parallelism via Simultaneous Multithreading", *ACM Transactions on Compuater Systems,* 15 (3), pp. 322–354, (Aug. 1997).

Smith, J.E., et al., "The Microarchitecture of Superscalar Processors", Proceedings of the IEEE, 83 (12), pp. 1609–1624, (Dec. 1995).

Yakovlev, A., "Designing Control Logic for Counterflow Pipeline Processor Using Petri Nets", *University of Newcastle upon Tyne Technical Report No. 522,* pp. 1–24, (May 3, 1995).

Janik, K.J., et al., "Synchronous Implementation of a Counterflow Pipeline Processor", Proceedings of the 1996 International Symposium on Circuits and Systems, vol. 4, 6 pages, (May 12–15, 1996).

Sproull, R.F., et al., "The Counterflow Pipeline Processor Architecture", *IEEE Design & Test of Computers,* vol. 11, No. 5, pp. 48–59, (Fall 1994).

|  | PIPE | REGISTER | LAST |
|---|---|---|---|
| HEAD → 0 | 0 | XX | XX |
| 1 | 1 | XX | XX |
| 2 | 0 | XX | XX |
| TAIL → 3 | 0 | R1 | 03 |

(RAT) ~50

|  | VALID | ALIAS |
|---|---|---|
| 0 | 1 | XX |
| 1 | 0 | 03 |
| 2 | 1 | XX |
| 3 | 1 | XX |

|  | PIPE | REGISTER | LAST |
|---|---|---|---|
| 0 | 1 | R1 | 03 |
| HEAD → 1 | 1 | XX | XX |
| 2 | 0 | XX | XX |
| TAIL → 3 | 0 | R1 | 03 |

(RAT) ~50

|  | VALID | ALIAS |
|---|---|---|
| 0 | 1 | XX |
| 1 | 0 | 10 |
| 2 | 1 | XX |
| 3 | 1 | XX |

| | T0 | T1 | T2 | T3 | T4 | T5 | T6 | T7 | T8 | T9 |
|---|---|---|---|---|---|---|---|---|---|---|
| LOAD R1, X | V/P (CORRECT) | | | | | | eV/NP | RET | | |
| LOAD R9, Y | V/P (INCORRECT) | | | | | | eV/NP | RET | | |
| ADD R2, R1, R2 | | | eV/P | | | | | V/NP | RET | |
| ADD R3, R4, R2 | | | | eV/P | | | | | V/NP | RET |
| ADD R8, R9, R4 | | | | | eV/P | | | eV/NP | | RET |
| ADD R7, R8, R4 | | | | | | eV/P | | | eV/NP | RET |
| ADD R5, R5, R5 | | eV/NP | | | | | | | | |
| ... | | | | | | | | | | |

FIG. 21

NON-STALLING CIRCULAR COUNTERFLOW PIPELINE PROCESSOR WITH REORDER BUFFER

BACKGROUND OF THE INVENTION

1. Field of the Invention

The present invention is related to the field of electronic data processing, and more particularly to a system and method of executing instructions.

2. Background Information

The current trend in microprocessors is to provide maximum speed by exploiting instruction level parallelism (ILP) both to hide long latency operations like memory accesses, and to execute multiple instructions at once. Currently the primary mechanism for doing this is an out-of-order superscalar processor. Such an approach typically uses renaming registers, reservation stations, and reorder buffers (ROBs) to hide latency and, as such, tends to rely on multiple slow, area intensive and expensive content addressable memories (CAMs). In addition, such an approach requires accurate global timing and global communication between the various structures across the entire chip. These constraints are likely to become problematic as technology advances to higher and higher clock rates. In fact, it will eventually become physically impossible to send signals from one side of the die to the other in a single clock cycle.

Counterflow processors provide a competitive alternative to the superscalar approach. Counterflow processors use highly localized communication to resolve the scheduling issues and resolution of data dependencies.

Sproull et al. first described the counterflow principle in an article entitled "The Counterflow Pipeline Processor Architecture" published in IEEE Design and Test of Computers in Fall 1994 (see R. F. Sproull, I. E. Sutherland and C. E. Molnar, "The Counterflow Pipeline Processor Architecture," IEEE Design and Test of Computers, pp. 48–59, Vol.11, No. 3, Fall 1994). Sproull described an asynchronous processor which offered a simple design methodology with many useful properties (including local control and local message passing). These concepts were used by Janik and Lu in the design of a synchronous processor (K. J. Janik and S. Lu, "Synchronous Implementation of a Counterflow Pipeline Processor" Proceedings of the 1996 International Symposium on Circuits and Systems, May 1996).

The basic counterflow processor includes two pipelines flowing in opposite directions from one another. One pipeline (the instruction pipeline or IPipe) carries the instructions up from the fetch or dispatch unit. The other pipeline (the result pipeline or RPipe) carries the operands or results of previously executed instructions down toward the dispatch unit. As an instruction and an operand pass, they "inspect" each other. The instruction checks the operands stored in the result pipeline to see if it needs any of the values. If it does, the instruction takes the operand and carries it along as it proceeds up the instruction pipeline waiting to execute. Meanwhile, the operands in the result pipeline check the instruction's destination to see if the instruction is going to update their value. If this occurs, the operands have an old copy of the result and they invalidate themselves.

If an instruction reaches its corresponding execution unit launch stage and has all of its operands, it is sent off to the execution sidepanels. If, however, it has not received its operands by this stage, it must stall, possibly stalling the instructions following it in the pipeline. Once the instruction has been sent off for execution, it proceeds up the pipeline. The execution sidepanels are clocked at the same rate as the instructions themselves. Therefore, an instruction's values are always at the same stage as the launching instruction. Upon reaching the associated recover stage, the result of the computation is loaded back into the instruction. The exception to this is the case where the execution unit has a variable latency, such as a memory execution unit. In this case, if the result has not yet been computed, the instruction has to stall at the recovery stage until the result is ready.

At any point after the instruction has retrieved a result from the execution unit, it monitors the result pipeline for an open slot. A slot is considered empty if it was invalidated by a previous instruction or it is simply empty because it hasn't been filled with anything yet. When an open slot is found, the result is sent down the result pipeline. Once the result is placed in the pipeline, the instruction will not send the result again.

The local interchange of information and the simple design of a counterflow pipeline (CFP) design support longer pipelines and increased processor throughput. Processors like those described by Sproull and Janik do, however, suffer a number of performance problems. Janik et al. describe some of these problems and a possible solution in "Advances to the Counterflow Pipeline Microarchitecture," presented at High-Performance Computer Architecture-3 in February, 1997. That article describes a Virtual Register Processor (VRP). The VRP moves the register file of the CFP processor to the bottom of the pipelines. This configuration eliminates the startup costs associated with the CFP processors, allows for a revalidate scheme that is far less expensive than a full flush on branch misprediction, and allows instructions to be removed from the instruction pipe when they are completed. In addition, by placing the register file at the bottom of the pipeline, operands no longer need to travel down the result pipeline, creating less competition for available slots in the result pipeline.

Unfortunately, allowing instructions to retire out of order eliminates the possibility of precise interrupts. To counter this Janik et al. describe the use of a reorder buffer (ROB) in combination with the VRP. In place of the register tags, all data values have a ROB tag associated with them that indicates the instruction that has generated or will generate the value. Each data value also includes a valid bit indicating whether the result has been generated yet. These tags are stored in the register file. The ROB also makes recovery from a mispredicted branch much easier.

The fundamental problem with the VRP approach is that the instruction pipeline is allowed to stall and can quickly clog the instruction flow. In addition, the VRP architecture, like the CFP processor architectures described above, is limited to only launching one instruction per clock cycle. What is needed is an architecture which provides the benefits of the CFP processor and VRP but which prevents or reduces instruction stalling. In addition, what is needed is a system and method for extending these counterflow architectures such that more than one instruction can be launched per clock cycle.

SUMMARY OF THE INVENTION

According to one aspect of the present invention, what is described is a system and method of executing instructions within a counterflow pipeline processor. The counterflow pipeline processor includes an instruction pipeline, a data pipeline, a reorder buffer and a plurality of execution units.

An instruction and one or more operands issue into the instruction pipeline and a determination is made at one of the execution units whether the instruction is ready for execution. If so, the operands are loaded into the execution unit and the instruction executes. The execution unit is monitored for a result and, when the result arrives, it is stored into the result pipeline. If the instruction reaches the end of the pipeline without executing it wraps around and is sent down the instruction pipeline again.

According to another aspect of the present invention, what is described is a processor and a computer system built using the processor. The processor includes an instruction pipeline having a plurality of stages, a result pipeline having a plurality of stages, an execution unit connected to the instruction pipeline and the result pipeline and a reorder buffer. The reorder buffer supplies instructions and operands to the instruction pipeline and receives results from the result pipeline. The instruction pipeline and the result pipeline wrap around the reorder buffer to create counter rotating queues. The execution unit includes an operand input and a result output, wherein the operand input receives an operand from the instruction pipeline. The execution unit transmits a result to the result output as a function of the operand received by the operand input.

According to yet another aspect of the present invention, what is described is a processor having an instruction pipeline, a result pipeline, first and second execution units and first and second reorder buffers. The first and second execution units are connected to first and second stages, respectively, of the instruction pipeline and the result pipeline. The first reorder buffer supplies instructions and operands to the first stage of the instruction pipeline and receives results from the first stage of the result pipeline. The second reorder buffer supplies instructions and operands to the second stage of the instruction pipeline and receives results from the second stage of the result pipeline.

According to yet another aspect of the present invention, what is described is a computer system having memory and a processor, wherein the processor is capable of executing a plurality of instructions, including a first instruction. The processor comprises a plurality of instruction pipelines, a plurality of result pipelines and a plurality of reorder buffers. Each reorder buffer receives instructions from one instruction pipeline and issues instructions to a second instruction pipeline. In addition, each reorder buffer receives data from one result pipeline and issues data to a second result pipeline. Each reorder buffer includes a register file having a plurality of registers, each register having a data entry and a tag field, and a register alias table having a plurality of register alias table entries, wherein each register alias table entry includes a pipeline field and a register field, wherein the pipeline field shows which instruction pipeline the first instruction was dispatched into and wherein the register field show the register into which the first instruction will write its result.

According to yet another aspect of the present invention, what is described is a method of executing more than one thread at a time. A first and a second reorder buffer are provided. First instructions and first operands associated with the first thread from the first reorder buffer are read and executed, with the result stored in the first reorder buffer, wherein storing the result includes marking the result with a tag associating the result with the first thread. Second instructions and second operands associated with the second thread from the second reorder buffer are read and executed, with the result stored in the second reorder buffer, wherein storing the result includes marking the result with a tag associating the result with the second thread.

According to yet another aspect of the present invention, what is described is a method of recovering from incorrect speculations in a counterflow pipeline processing system having an instruction pipeline and a data pipeline, both of which feed back into a reorder buffer. A mispredicted branch having a first instruction is detected and all instructions occurring after the mispredicted branch are invalidated in the reorder buffer. If the first instruction is in the instruction pipeline and can execute, the instruction is executed and the results associated with that instruction are invalidated when they reach the reorder buffer. If the instruction reaches the end of the instruction pipeline, it is deleted.

According to yet another aspect of the present invention, what is described is a method of controlling data speculation. An instruction is provided and an operand associated with the instruction is obtained. A check is made as to whether the operand is valid and whether the operand is a speculative value and the operand is marked accordingly. The instruction is then executed in order to generate a result as a function of the operand and, if the operand was a speculative value, checking the operand for a nonspeculative value for the operand, comparing the nonspeculative value against the speculative value and, if the speculative value was correct, saving the result.

BRIEF DESCRIPTION OF THE DRAWINGS

FIGS. 15a and 15b illustrate an example of how the register alias table and register file together are used to process an instruction;

FIG. 21 illustrates speculative data processing in dynamic dataflow machines.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. At the same time, the term "function" is used to indicate that a mathematical or logical correspondence exists between an operand and a result. For example, the area of a rectangle equals the height of the rectangle multiplied by the length (A=h*1). In this example, the area could be said to be a function of the height, of the length, or of both the height and the length.

Figure 1:
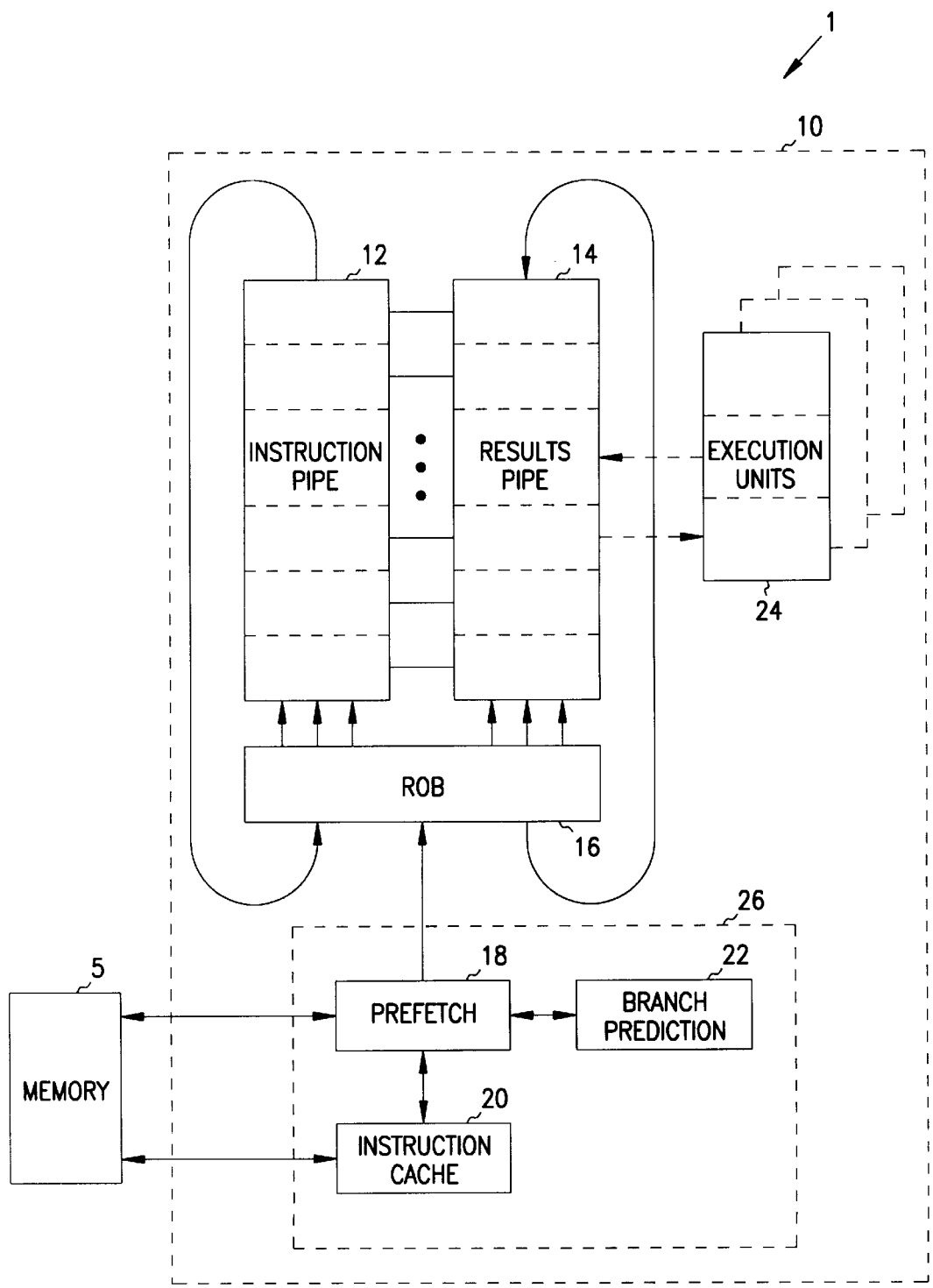
FIG. 1 illustrates a computer system having a counter-dataflow pipeline processor according to one aspect of the present invention.

A computer system 1 having a memory 5 and a counterdataflow (CDF) pipeline processor 10 is shown in FIG. 1. In one embodiment, memory 5 is implemented as a memory hierarchy formed from memory devices having various access speeds.

Processor 10 of FIG. 1 includes a instruction pipeline 12, a result pipeline 14, a reorder buffer 16, a dispatch unit 26 and one or more execution units 24. In one embodiment, dispatch unit 26 includes a prefetch queue 18, an instruction cache 20 and a branch prediction circuit 22.

In contrast to the VRP approach, in the embodiment shown in FIG. 1 pipelines 12 and 14 are counter-rotating queues. Just as in the two previous architectures, instruction pipeline 12 moves up while result pipeline 14 moves down. In system 1, if an instruction gets to the end of pipeline 12 and hasn't executed, it simply wraps around to the beginning of pipeline 12 and continues up the pipeline.

Result pipeline 14 acts similarly, only for slightly different reasons. The results, upon reaching the bottom of the pipeline 14 do not necessarily need to wrap around. They could just write their values into ROB 16, and exit the pipeline. The results are forced to wrap around for performance reasons. In most cases, the results that an instruction generates may be used by the instructions immediately following. If this happens, the following instruction must go all the way around the pipeline just to read the value from the ROB. This both increases the latency to execute instructions as well as puts additional read ports on the ROB. By forcing the results to make one extra trip around the pipeline, the worst case delay waiting for a result will be half the length of the pipeline (since the instruction and result pipeline are moving in opposite directions). Since neither of the pipelines are required to stall, by having the results make the one extra trip around the pipeline, it is guaranteed that all instructions will pass the result and will read it if they need the value.

In one embodiment of the processor 10 shown in FIG. 1 results from execution of an instruction are recovered in result pipeline 14 rather than in instruction pipeline 12. This is different from the original counterflow pipeline processor, which recovers the result into the instruction pipeline and, therefore, which requires the sidepanels to lock-step with the pipeline stages. Since in this embodiment results are recovered into result pipeline 14 variable length execution is no longer a problem.

The counterdataflow architecture of FIG. 1 differs from VRP in that the CDF approach wraps both the instruction and result pipelines around. This change brings out various enhancements, resulting in both performance improvements as well as simplifications in implementation. Since the instruction pipeline no longer stalls, the last remaining global signal, the pipeline halt signal of the VRP, has successfully been removed and one of the main premises of the counterflow architecture, local control, has been achieved.

In one embodiment of the present invention instruction pipeline 12 is fed back onto itself through the instruction decode unit. This greatly simplifies the individual pipe stages. Instructions don't ever need to stall because there is always a sidepanel capable of executing them 'further down' the pipeline. Additionally, the need to check for dependencies between instructions concurrently launched is eliminated since there is no 'last sidepanel' stall to deadlock the pipeline. The resulting pipeline 12 behaves almost identically to VRP but with three key differences. First, as mentioned before, there is no concept of a 'last sidepanel' so there is no stalling in the instruction pipe. The instructions are merely reissued back into the bottom of the pipeline 12 if they reach the top of the instruction pipe without being executed. Second, after instructions are launched into a sidepanel, they are not required to remain in the pipe. This is important since the slots are needed to insert new instructions into the pipeline. Finally, results are recovered into the result pipe, not the instruction pipe, so that lockstepping the sidepanels to the pipeline is unnecessary, and variable-length execution latency is no longer a problem.

If a processor design does not allow multiple instructions to be issued each clock cycle, the instructions per cycle (IPC) can never become greater than one. This was a significant restriction for all previous counterflow-based designs. The older designs needed either complex hardware to detect and prevent potential deadlocking pairs or some kind of VLIW support.

The CDF approach requires neither. Instead, the issues of data dependencies are completely resolved in the pipeline.

Multiple Instructions Per Clock Cycle

Figure 2:
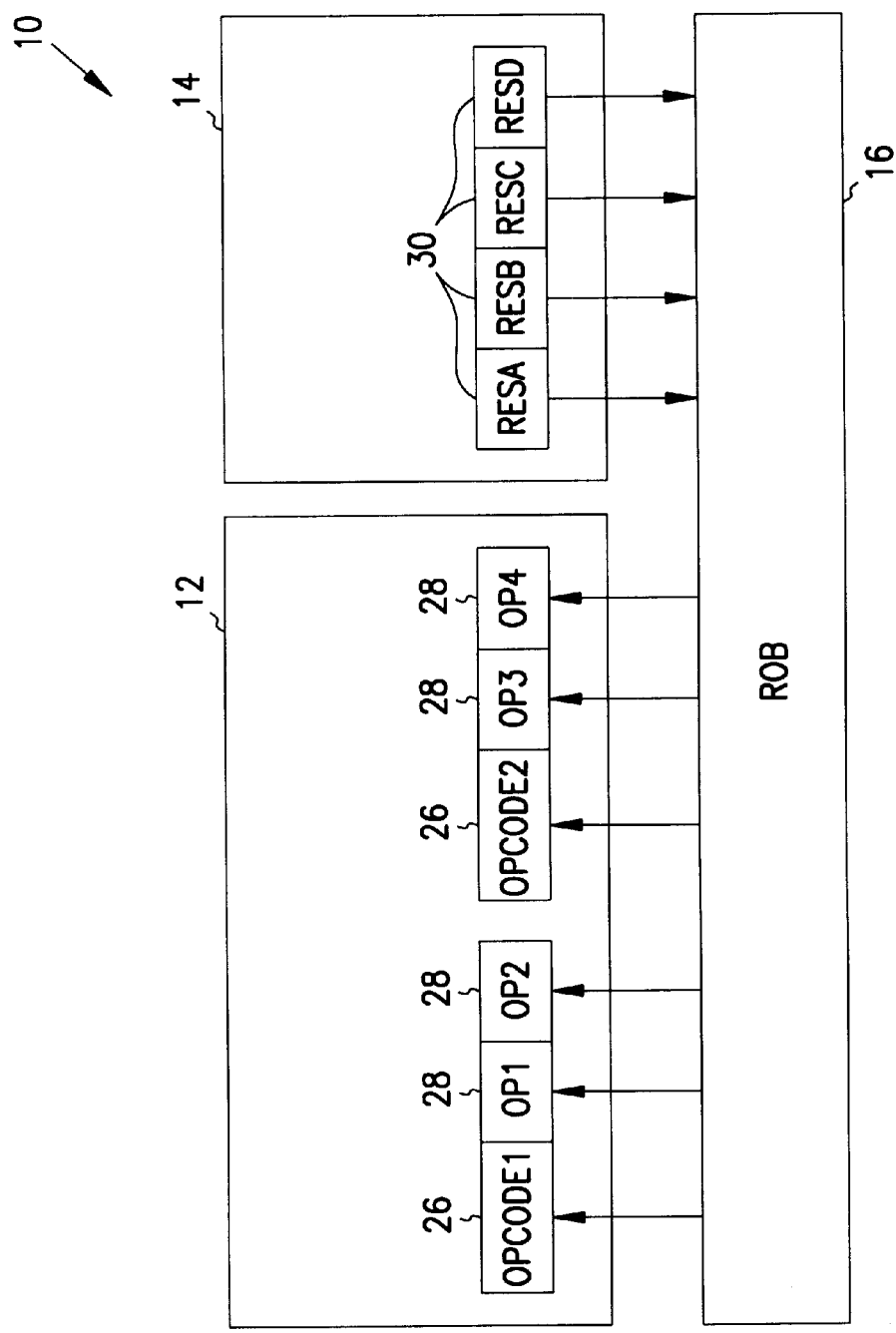
FIG. 2 illustrates one embodiment of a counterdataflow pipeline processor capable of executing more than one instruction per clock cycle.

In one embodiment, more than one instruction is issued per clock cycle. This can be done by making each stage of instruction pipeline 12 wider. One such embodiment is shown in FIG. 2. In the embodiment shown in FIG. 2, a ROB 16 inserts two instructions per clock into instruction pipeline 12. Each instruction includes an opcode 26 and two operands 28. Likewise, the width of result pipeline 14 needs to reflect the increased volume of results. For instance, in the embodiment shown in FIG. 2, pipeline 14 is designed to handle up to four results 30 per cycle.

In the embodiment shown in FIG. 2, it doesn't make any difference if instructions in the same stage are dependent on each other since, if the dependency isn't resolved by the end of the pipeline, the instruction or instructions will simply wrap around and execute in the next, or subsequent, pass of the pipeline. In VRP and CFP processor designs, the dependent instruction would stall the entire pipeline waiting for its operands.

The width of the instruction pipeline is unlimited, it is possible to launch unlimited instructions per clock cycle. In all practicality, the number of instructions issued per clock cycle is, however, bounded by the available die area, and by the amount of logic which can be executed during one clock cycle. Currently, a width of four to eight instructions wide seems feasible, but with future advances in processing technology, that number can be expected to increase.

Out-Of-Order Execution

By its very nature, CDF executes instructions out of order. Any instructions which are not able to execute in their first pass through pipeline 12 will wrap around and be surrounded by younger instructions just being issued. Even for a processor where instruction pipeline 12 is one instruction wide, the instructions are fetched in order, but the instructions will be executed regardless of order, chosen only by which instructions are ready to be executed. With a wider instruction pipeline 12, deep speculation occurs, exposing more available parallelism than would otherwise be possible. Since more instruction level parallelism is exposed, the number of instructions executing at any given time increases thus increasing performance. This will be illustrated later in the simulation results section.

Fast Clock Cycle

The counterflow pipeline principle was first developed for its use of local control. This allows a very fast clock cycle since there need be no global signals which take a relatively long time to cross the chip. Unfortunately, there has always been one signal which needs to propagate through the pipeline from start to finish. Up until now, the instruction pipeline has always needed to stall. It is possible for an instruction at the very end of the pipeline to stall thereby needing to stall every instruction down the pipeline back to the fetch unit. This has been the bottleneck in maximum clock speed for the CFP and VRP processors.

Since CDF's instruction and result pipelines wrap around, there is no longer any reason to stall. This lessens the logic complexity in the basic pipeline cells as well as in the pipeline to execution unit logic. With this innovation, the architecture has returned to counterflow's basic premise of obtaining high clock speeds by having local control of information and a simple pipeline.

Easy and Inexpensive Recovery from Incorrect Speculation

Modern microprocessors have very high branch prediction rates, greater than 90%. Even with such high branch prediction rates, however, some 10% of the time the prediction is still wrong. It is important to be able to recover from these incorrect speculations quickly and inexpensively. Since the speculation in CDF is even higher than other processors, it is even more important for this recovery to be efficient. CDF accomplishes this in much the same way that other modern processors (including VRP) do, by using a ROB. When a mispredicted branch is detected, all instructions after the branch are invalidated from the ROB. In most other architectures, the instructions are either forced to complete execution (and therefore continue to use up valuable resources) or they are explicitly removed from the processor using extra hardware.

In CDF, a hybrid approach is taken. If an instruction can execute, it is allowed to. When the results return to the ROB, they are ignored and deleted from pipeline 14. If the instruction has not managed to execute, when it wraps around and passes the ROB, it sees that it has been invalidated in the ROB, and deletes itself from pipeline 12. This allows at least some instructions to not have to execute.

Such an approach is especially important for an architecture such as CDF, where aggressive speculation occurs. When an incorrectly speculated branch has been identified, all of the incorrect instructions in the shadow of the branch are not required to complete their execution and can leave the machine without having taken up time and space in the execution units.

Tolerance of Long Latency Execution Units

In CFP and VRP designs, instructions that have begun executing remain in the pipeline until they have completed. For long latency instructions like loads, stores, and floating point operations, these instructions can stall the entire pipeline, keeping unrelated instructions from executing even though resources may be available.

In CDF, once an instruction has begun executing, it leaves instruction pipeline 12. The results of the execution do not need to be matched with the corresponding instruction until they arrive at ROB 16. Therefore, the results may be simply sent down the result pipeline whenever they complete.

By doing so, load and store instructions are saved from having to wrap around pipeline 12 several times in the case of a cache miss. This frees up space in instruction pipeline 12 for another instruction to enter the pipeline, thus increasing the instruction window and the amount of available parallelism exposed in pipeline 12.

Simulation Results

To analyze the CDF architecture, many different pipeline configurations were simulated. The configuration in FIG. 3 had the best average performance and was, therefore, chosen for full analysis. It should be apparent that other embodiments are also possible given the problem to be solved and the area available on a particular die.

Figure 3:
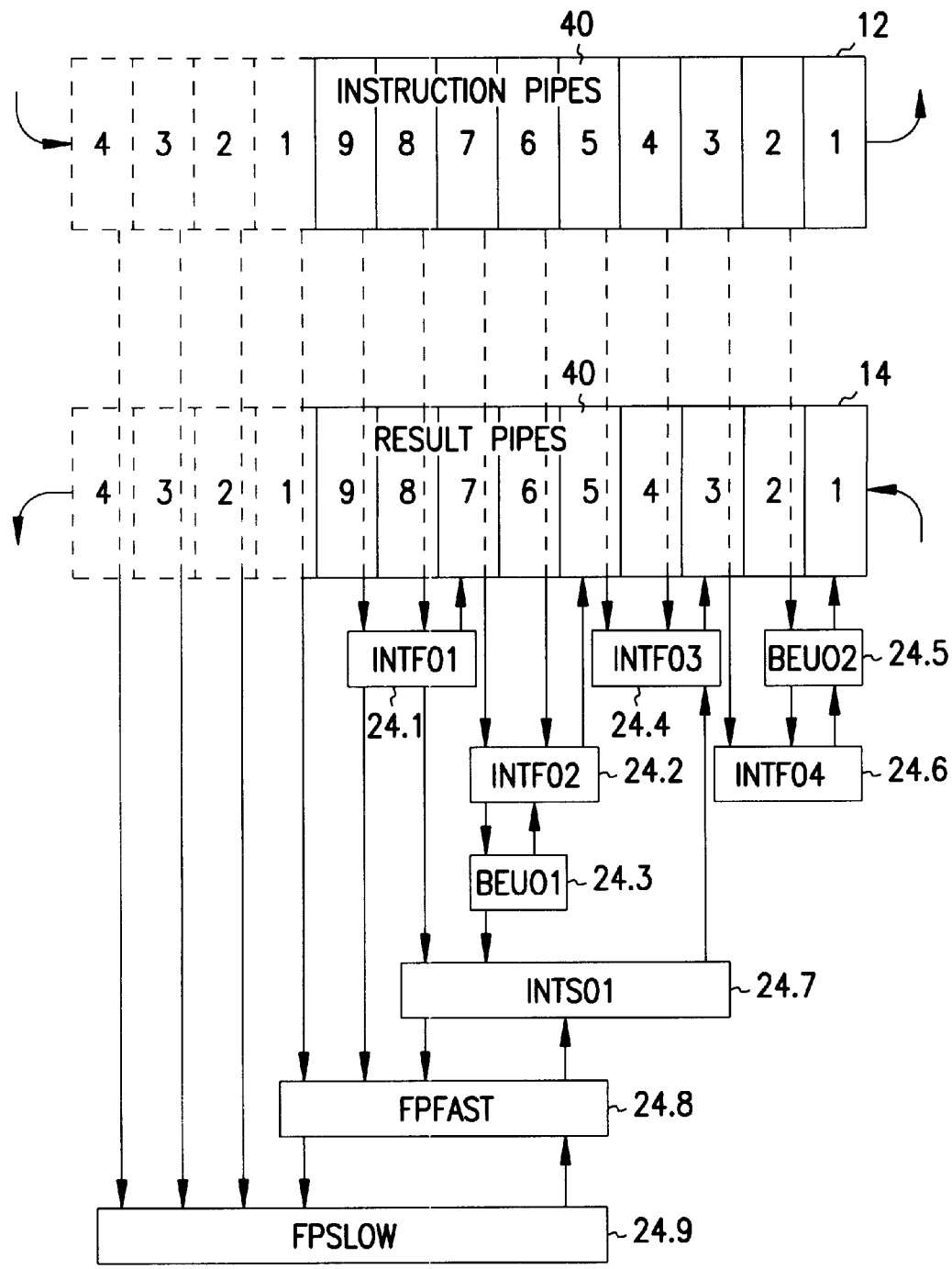
FIG. 3 illustrates one embodiment of the counterdataflow pipeline processor of FIG. 1.

In the embodiment shown in FIG. 3, instruction pipeline 12 holds up to four instructions in each pipestage 40. Result pipeline 14 holds up to eight results in each pipestage 40. In FIG. 3, the top four pipestages 40.1 through 40.4 have been replicated at the bottom of pipelines 12 and 14 in order to illustrate that the two floating 15 point units launch on one cycle of the pipeline and recover on the next cycle. Since these execution units have such long latencies, it was observed to be better for overall performance to recover on the next revolution at the location where the instructions that immediately followed the launching instruction will be. These instructions are the mostly likely ones to be waiting for the result of the execution and they therefore receive the result the earliest.

In the embodiment shown in FIG. 3, there are four fast integer units (INTF01–INTF04). These units have a one cycle latency and handle instructions such as addition, subtraction, logical operations, etc. There are two branch execution units (BEU01–BEU02). These units have a one cycle latency, and communicate the results of a branch back to the branch prediction unit. There is one slow integer unit (INTS01). It has a latency of four cycles, is fully pipelined, and handles slow integer instructions such as multiply and divide. There is one fast floating point unit (FPFAST). It has a latency of four cycles, is fully pipeline, and handles fast floating point instructions such as floating point addition and subtraction. There is one slow floating point unit (FPSLOW). It has a latency of eight clock cycles, is fully pipeline, and handles slow floating point instructions such as floating point multiply and divide. There is a memory execution unit (MEU), not pictured, which handles load and store instructions and communicates with the ROB to maintain proper ordering of load and stores. Finally, there is a one level one (L1) data cache, not pictured, which, in one embodiment, is a 16 KB, 4-way set associative data cache, with one cycle access time, and a pseudo least recently used (pseudo LRU) replacement policy.

The simulation results will be discussed next. In the simulation the following assumptions have been made to allow for a higher level simulator. It is assumed that the L1 cache and main memory hold all necessary data and that the main memory has a constant 10 cycle access latency. The branch prediction unit has a randomly predicted 94% correct branch prediction rate and, when recovering from a mispredicted branch, there is a one cycle "no fetch" penalty. To maintain precise interrupts, store instructions are not allowed to complete until they are the oldest instruction in the ROB. Also, the ROB is allowed to retire as many instructions as it needs to per clock cycle.

Figure 4:
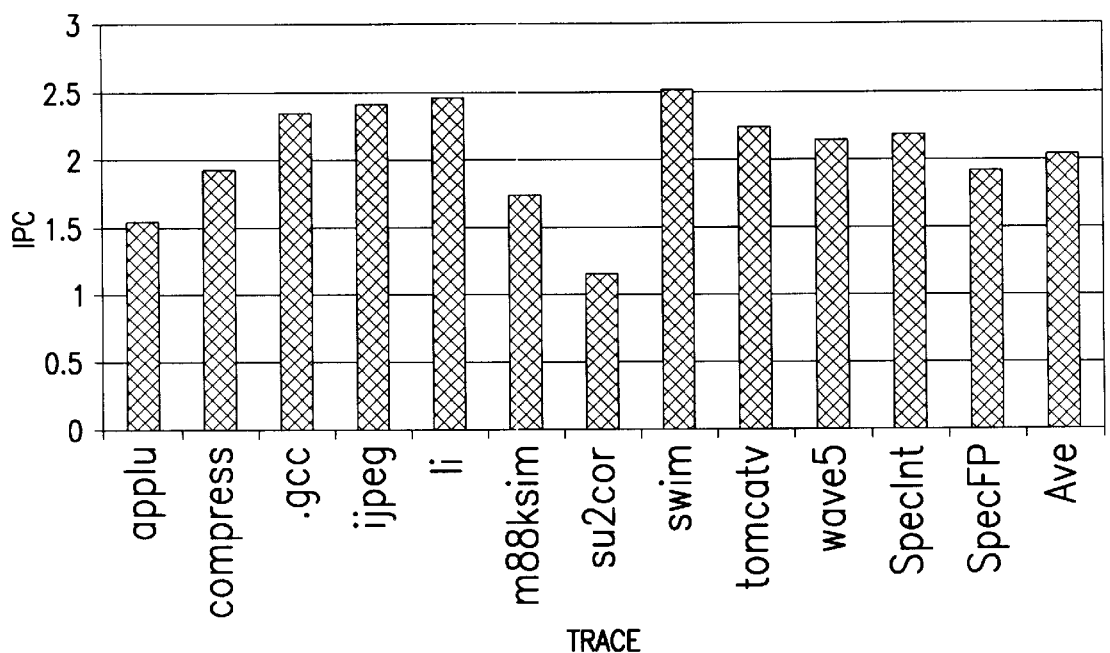
FIGS. 4–12 illustrate simulation results corresponding to Spec95 benchmarks of one embodiment of the counterdataflow pipeline processor of FIG. 3.

A selection of traces from ten of the Spec95 benchmarks were run. Five of the traces (m88ksim, gcc, compress, li, and ijpeg) were integer traces, and the other five (tomcatv, swim, su2cor, applu, and wave5) were floating point (FP) traces. FIG. 4 shows the performance in average instructions executed per clock cycle for each trace. While the average integer performance is slightly higher than the average FP performance, it is interesting to note that the floating point traces had widely varying performances, resulting in both the highest performance (swim with an IPC of 2.5) and the lowest performance (su2cor with an IPC of 1.1). The average performance is 2.0 instructions per clock cycle.

Figure 5:
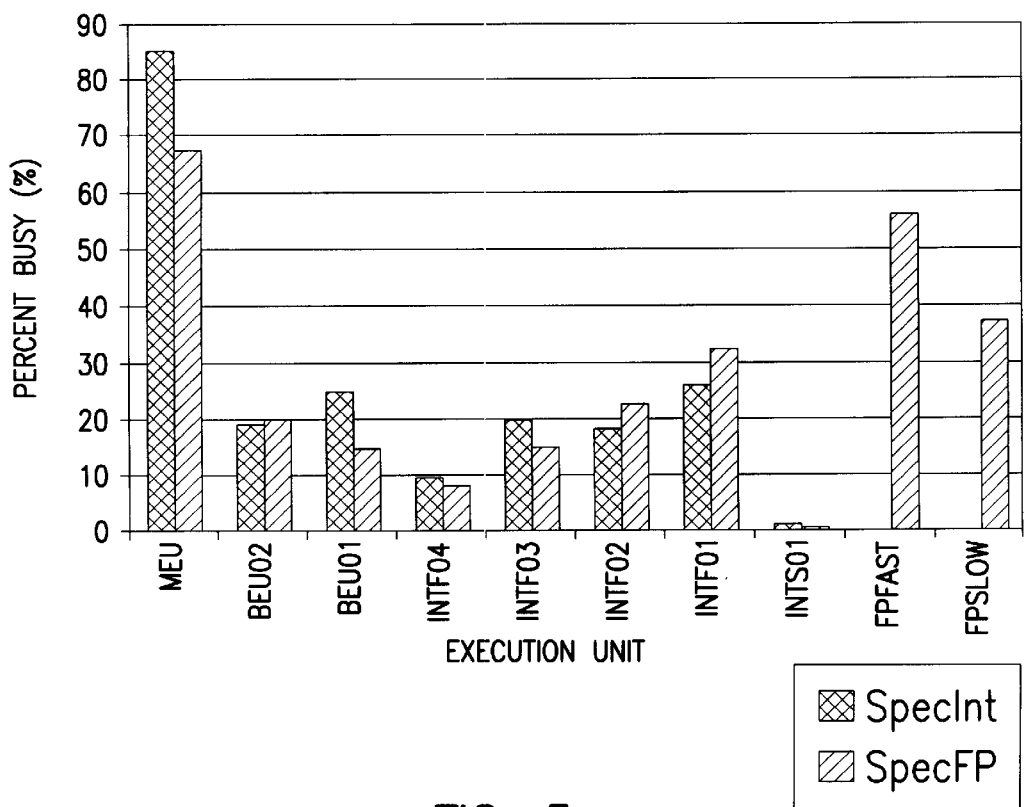

Current technology allows many execution units to be fabricated. The problem is that up until now, processors haven't been able to utilize these execution units. For much of the time, machines with five or six executions have these units busy performing useful work only 20–30% of the time. With CDF, many instructions are brought into the machine to be potentially executed, thus increasing the effective instruction window. Also, by allowing instructions to launch to execution units 24 at multiple locations, it looks (from the viewpoint of the instructions) as though there are more execution units. FIG. 5 shows the percent of time the execution units were kept busy for both integer and floating point traces. Since the memory execution unit (MEU) was able to accept up to five instructions, and these are capable of taking long periods of time, it is not surprising that the MEU was busy most of the time, 85% for SpecInt and 68% for SpecFP. The fast and slow floating point units (FPFAST and FPSLOW) are similar with 57% and 38% respectively. Since SpecInt traces have negligible numbers of floating point instructions, they essentially do not use the floating point execution units. The compiler used to generate the traces unfortunately had the penalty for using slow integer operations set high and therefore generated few of these instructions, causing the slow integer unit to be rarely used.

The utilization of the pipelines is of prime interest in attempting to optimize a CDF processor's performance. The ultimate goal in CDF is to get the maximum number of instructions into the machine as possible. This increases the exposed available parallelism in the code and allows useful work to be done even when older instructions may be waiting for their data. The number of instructions that can be launched is the same as the number of instructions which do not wrap around the pipeline. This shows that while it is advantageous for instructions to be able wrap around if they cannot execute, performance suffers if instructions wrap around too much. For example, if the instruction pipeline is four instructions wide and a set of instructions get to the top of pipeline 12 with none of the instructions having been able to launch in that pass through the pipeline, no new instructions are able to enter the machine during that clock cycle. However, if two of those instructions did manage to launch, two new instructions can enter the machine and have a chance to execute.

Figure 6:
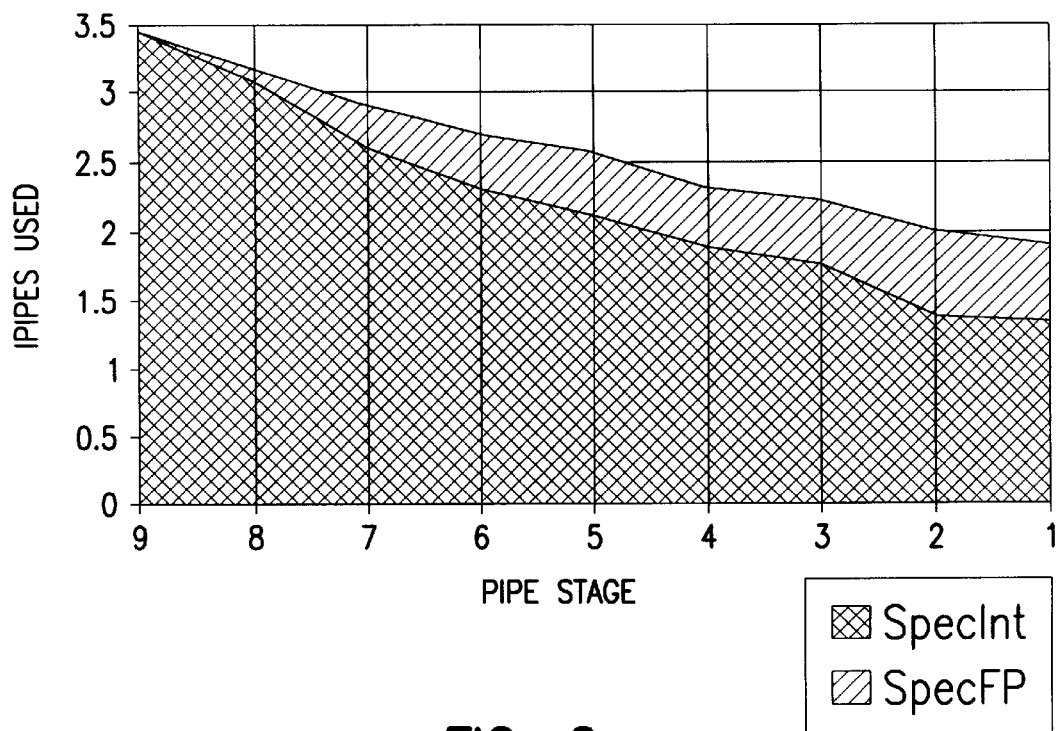

FIG. 6 shows the instruction pipeline utilization for the pipeline configuration depicted in FIG. 3. Pipestage 9 is at the bottom of pipeline 12 (i.e., where instructions enter). Pipestage 1 is the top of pipeline 12 (i.e., where instructions wrap back to stage 9).

At stage 9, the average number of instruction pipelines used is approximately 3.4 for both the SpecInt and SpecFP traces. It is less than the ideal case of all four instruction pipelines being used because prefetch is assessed a one cycle penalty every time a branch is taken. Therefore, every time a branch is taken, the other instructions prefetched after the branch are discarded, to be fetched in the next clock cycle.

The more important number is the average number of instruction pipelines used at the top of the pipeline. The SpecFP traces have just under two instruction pipelines used and the SpecInt traces have approximately 1.5 instruction pipelines used. This is because the SpecFP instructions stay in the pipeline longer due to the longer latency of the floating point execution units. Still, an average of 2 new instructions have an empty slot to enter the pipeline at each clock cycle. Ideally, this results in an IPC of 2. From FIG. 5, it is shown that the SpecFP traces had an actual IPC of approximately 1.9. For the SpecInt traces, the IPC will ideally be 2.5 while the actual IPC observed was 2.2. These differences can be attributed to incorrect branch prediction, and the fact that instructions cannot always be fetched to fill the empty slots.

Figure 7:
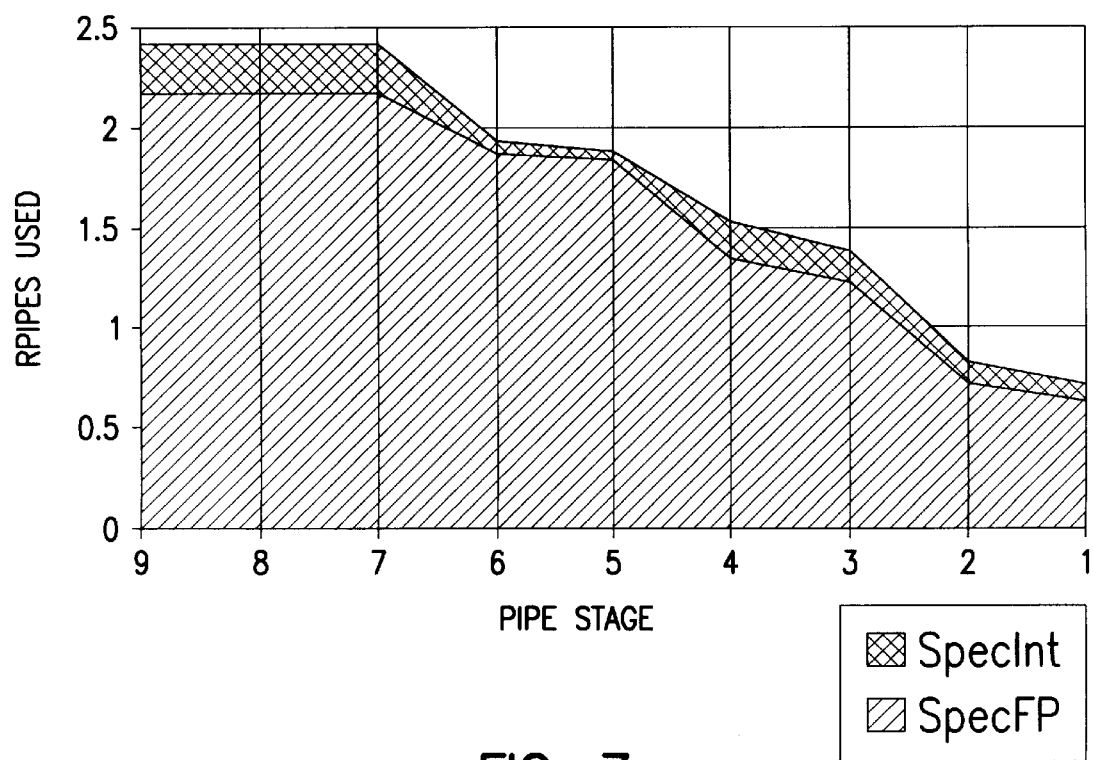

Result pipeline 14 utilization (shown in FIG. 7) is usually less important than instruction pipeline 12 utilization. It only affects performance if reduced considerably. Still, the results in FIG. 7 are useful to estimate how wide to make the result pipeline so that it does not become the performance bottleneck. In the pipeline configuration simulated, the result pipeline was made eight results wide. This, as it turns out, was considerable overkill for the circumstances. Again, pipestage 9 is the bottom of the pipeline where the results are written back to the ROB, and pipestage 1 is the top of the pipeline where some results wrap around. At the bottom of the pipeline, an average of 2.3 results are in the pipeline. Therefore the usage of the result pipeline is constant at the bottom of the result pipeline. This occurs because no execution units recover at these pipestages. In addition, since result pipeline 14 does not stall, no results enter or leave at these stages. The majority of the congestion, therefore, occurs in the middle of pipeline 14. If result pipeline 14 is not wide enough, results will not be able to find empty locations in which to write their results back in to, and they will not be able to leave the execution units, thus causing the execution units to stall. Although the execution units stall, this still does not cause either of the result or instruction pipelines to stall. (Instructions will just continue passing the execution units until they are no longer stalled.)

Figure 8:
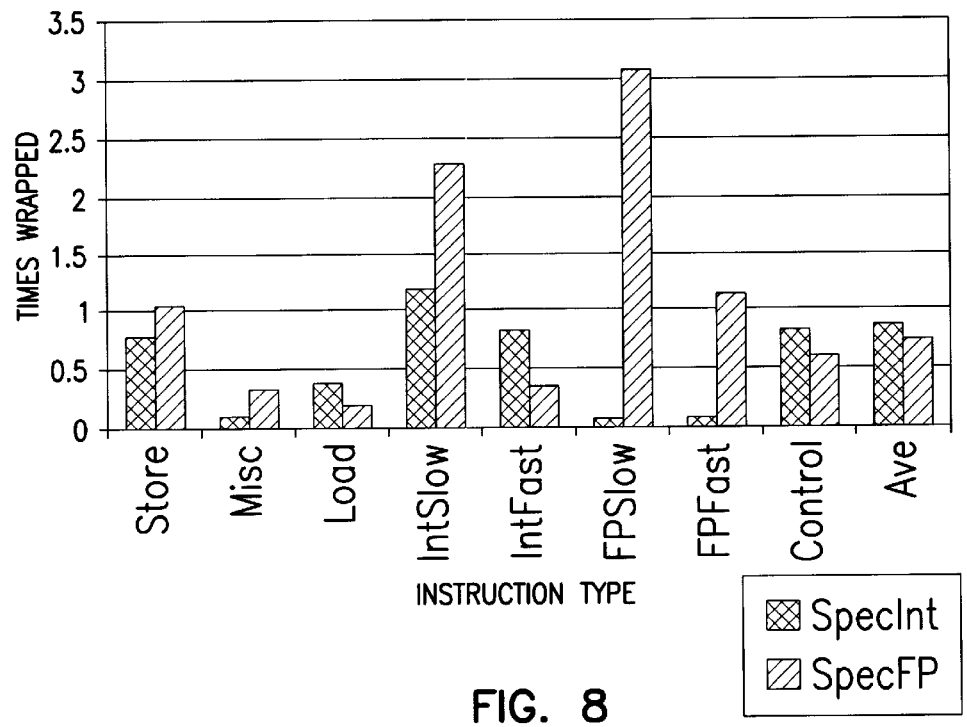

When attempting to optimize the pipeline configuration for maximum performance, it is useful to observe the average number of times various types of instructions wrap around the pipeline. It was shown in FIG. 6 that the average performance is strongly dependent on how many instructions are left in instruction pipeline 12 at the top of the pipeline. To minimize this number, instructions must launch into the execution units 24. FIG. 8 shows the breakdown of the average times an instruction wraps by type of execution unit 24. (This graph can, however, be misleading since it does not take into account the number of instructions of each type. For example, the slow integer instructions (INTSLOW) wrap an average of 1.7 times.

Figure 9:
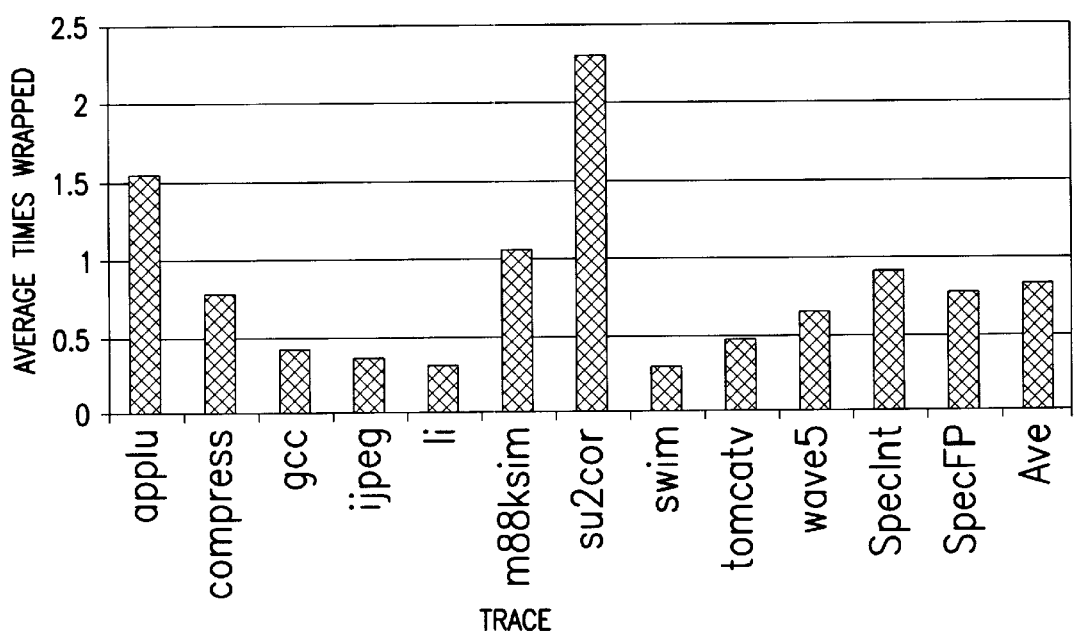
Figure 10:
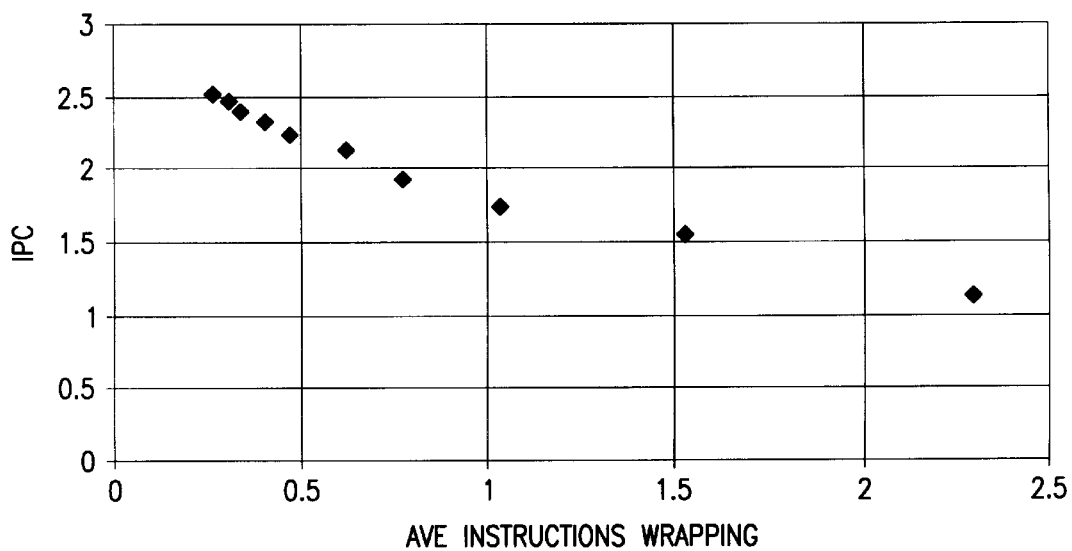

While this is relatively high, there are almost no slow integer instructions, so it's reasonable to ignore optimizing these in favor of decreasing the number that wrap of a more common instruction type.) The floating point instructions wrap considerably more than integer instructions because of the fact that their execution latencies are longer. The effects of the very high amount of wrapping for slow floating point instructions (FPSLOW) is somewhat offset by the fact that they are usually the end result of a long computation and other instructions are generally not dependent on the result. Minimizing the number of instructions wrapping has been used as the main metric for optimizing the performance of a CDF processor. It is interesting to analyze the data to see how well this data correlates to actual performance on a trace by trace basis. FIG. 9 shows the average number of times instructions wrapped by trace. It does indeed show that those traces with the lowest performance wrapped the most while those with the highest performance wrapped the least. Not surprisingly, the two traces whose instructions wrapped the most, applu and su2cor, are floating point benchmarks since the latencies involved in floating point operations are higher. To aid in analysis, FIG. 10 shows a scatterplot of IPC versus average wrapping by trace. There is essentially a linear relation between performance, expressed in instructions per clock cycle, and the average number of instructions wrapping. It follows that a major aim of improving performance is to try to have as few instructions as possible wrap around the pipeline.

Figure 11:
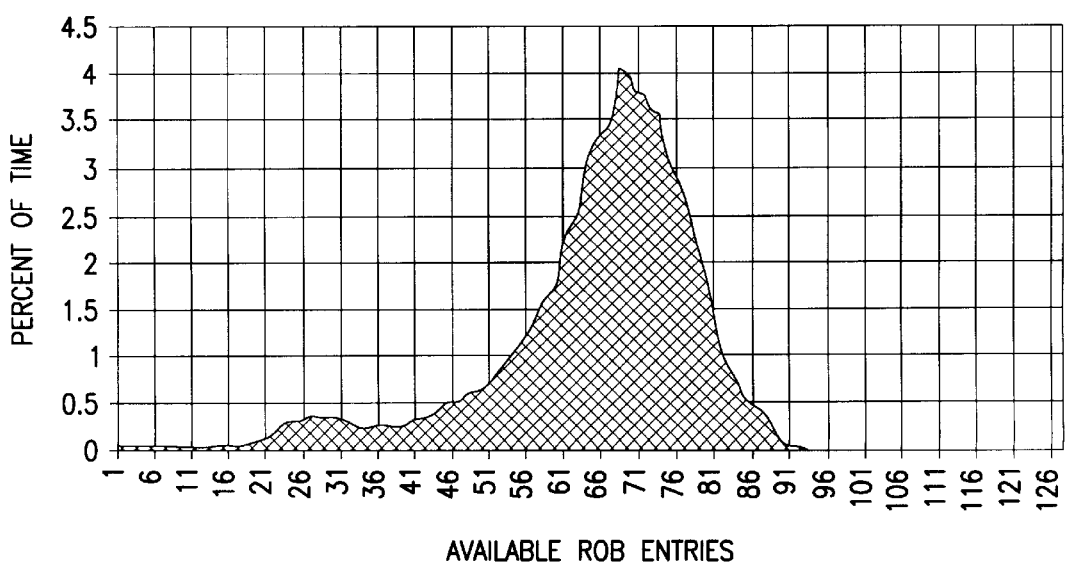
Figure 12:
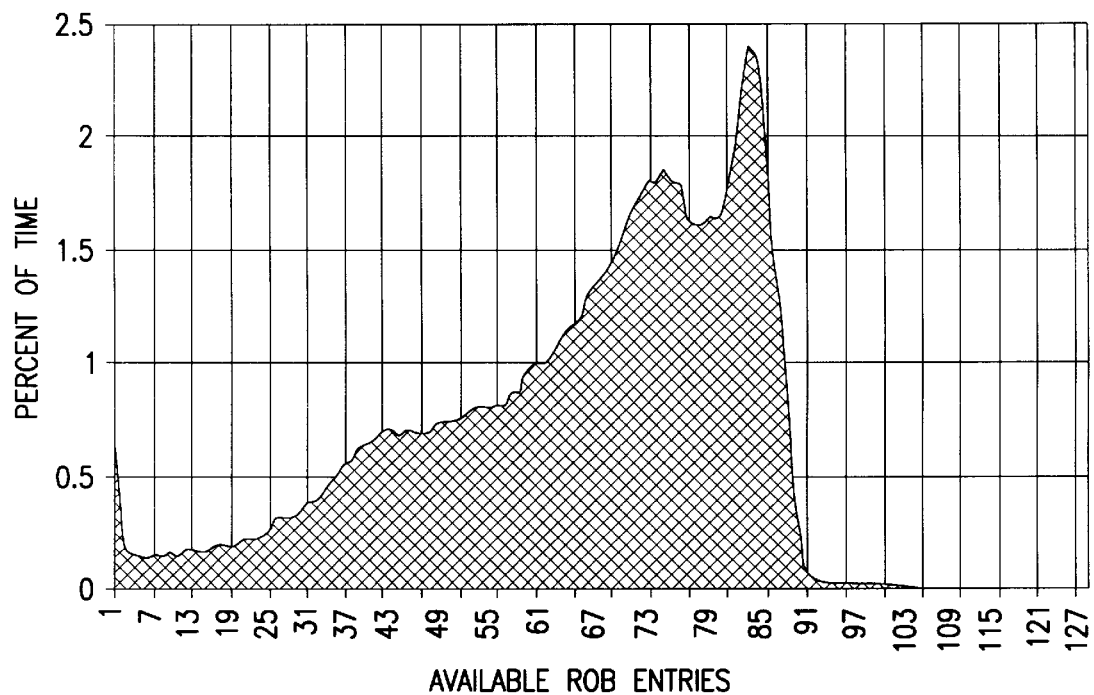

Another useful metric is the average number of entries that are available in the ROB. FIGS. 11 and 12 show the distribution of available entries for both the SpecInt and SpecFP traces. These give an idea of the size of the instruction window being exposed during execution. It is impressive to note that in the pipeline configuration simulated there are only locations for 36 instructions (9 pipestages with a width of 4 instructions), but the simulation averages over 60 instructions in the machine at a time for SpecInt traces and 80 instructions for SpecFP traces. Both sets of traces reach the limits of the 128 entry ROB, but only the SpecFP traces actually appear to be limited by having only 128 entries. Indeed, 0.7% of the time the ROB size is limiting the number of instructions that can enter the processor.

It is interesting to note that more instructions can be in processor 10 at a given time due to the fact that once an instruction has entered an execution unit 24, it no longer needs to be kept in the instruction pipeline. When the results are eventually computed, the instruction's results are sent down result pipeline 14 tagged with the ROB tag of their originating instruction. These large instruction windows allow more of the program's inherent parallelism to be exposed and thus improving performance.

The microarchitecture of the counterdataflow processor has been described. One embodiment of such a processor 10 has been described and its performance simulated. It has been shown that the CDF microarchitecture is an efficient means of exposing the available parallelism in a given program and dispatching instructions to multiple execution units. The problems of the earlier CFP processor architectures, pipeline stalling and single instruction issue, have effectively been solved and are no longer a bottleneck to higher processor performance.

The distributed architecture of CDF lends itself well to allowing a number of interesting features and modifications that can improve performance with minimal area additions. In the following sections we will discuss some of these features. First, we'll explore changes to ROB 16 to make it into a non-associative structure (this allows us to make a larger effective ROB out of smaller, faster, distributed ROBs). Second, we'll discuss the application of multithreading to the CDF architecture. Third, we'll discuss the ability of CDF to manage data prediction in a very efficient manner. Fourth, we'll look at how complex instructions can be mapped onto this RISC style architecture. Finally, we'll explore the effect of ultra-high speed clocking on the CDF pipelines.

Using a Non-associative Reorder Buffer

Currently, out-of-order processors tend to have some kind of reorder mechanism to support precise interrupts. In superscalar designs, in VRP and in CDF this reorder mechanism can be implemented as content addressable memories (CAMs), where the CAMs are used to determine data dependencies. Ideally, these structures should be as large as possible, as they usually determine the instruction window size but, being CAMs, they tend to be both expensive and slow.

In one embodiment, therefore, ROB 16 is constructed with non-associative memory. When the width of instruction pipeline 12 is greater than one, ROB 16 can be divided into as many sections as there are horizontal entries in the instruction pipeline. Then, the actions taken by ROB 16 can be done exclusively through the use of indexing and "last modified by" tags for register file. This approach also helps reduce the number of read and write ports required on each ROB 16.

The penalty for creating a non-associative ROB is that when a branch misprediction occurs, the table containing the ROB entries for instructions writing to RF 52 must be reconstructed. While instructions can be allowed to continue to execute during this reconstruction time, no new instructions can be issued. In one embodiment, the penalty is approximately 4 to 32 cycles, depending on the size of the ROB and the degree of segmentation. This is acceptable if the branch prediction rate is sufficiently high (i.e., if the design compensates for a high mispredict cost with good branch prediction).

As an example, a Re-order buffer in a circular counterflow pipeline processor can be constructed with non-associative memory. If all the data tokens must travel at least one half complete trip around result pipeline 14, we are able to use a simple re- order buffer (ROB) which requires no associative capability. This is a great improvement since the ROB can be larger, thus giving better performance without paying for the buffer access time and area. Forcing data tokens to travel half of the pipe length does not incur much penalty since both the instruction pipeline and the data pipeline are moving in opposite directions. Their relative speed is twice that of a pipeline. So forcing the data tokens to go through a minimum half loop resolves the data dependencies up to twice as fast as letting it stop in the ROB. This can be implemented in a slightly unusual manner since all data tokens are required to finish their journey at the ROB. We mark the data tokens that are recovered into the result pipe after the halfway point as not needing to pass the ROB. We mark those results recovered before the halfway point as needing to pass the ROB. With these markings we assure every results must travel at least half of the pipe length. Therefore the distance traveled for a token recovered in the first half of the pipe is greater than 1 length, but less than 1.5 pipe lengths. But a token recovered in the second half of the pipe travels greater than half the lengths, but less than one length. Because recovery points usually are later in the pipe, and long latency instruction recover points like floating point and memory the latter timing is more common. Moreover, when there instruction pipe width is greater than one, the ROB can be divided into as many sections as there are horizontal entries in the instruction pipeline. Then, the actions taken by the ROB can be done exclusively by indexing and "last modified by" tags for the register file. This also helps reduce the number of read and write ports required on the ROB.

Distributed Reorder Buffer

Figure 13:
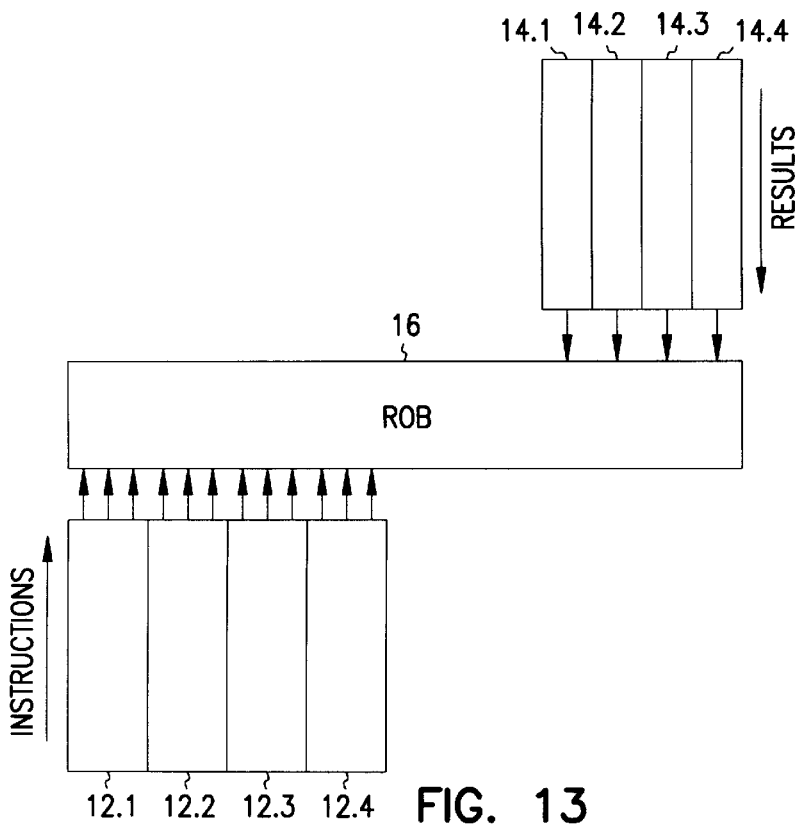
FIG. 13 illustrates one embodiment of a reorder buffer which can be used in the system shown in FIG. 1.

In the embodiment of CDF shown in FIG. 1 reorder buffer (ROB) 16 is in great demand. For a CDF pipeline, illustrated in FIG. 13, with four instruction pipelines (12.1–12.4) and four result pipelines (14.1–14.4), in one embodiment, ROB 16 includes eight write ports and eight read ports. (This assumes an instruction format where there is a maximum of two operands.) That is, eight write ports and eight read ports is the maximum number of ports that ROB 16 may need to be able to handle. (That is, since in CDF the instruction and result pipelines do not stall, it is possible that all of the pipelines could be full and need processing by ROB 16. In that case, ROB 16 has to be able to handle all of these requests simultaneously.)

It is possible that the pipelines could be altered to allow instructions and data to flow past ROB 16, but ROB 16 then becomes the bottleneck for new instructions to enter processor 10. Having many read and write ports on the ROB increases the ROB's complexity and increases the time required to access the data. Therefore, increasing the number of ports limits the maximum clock speed at which processor 10 can run.

In one embodiment, this potential bottleneck is avoided by segmenting reorder buffer 16. The CDF architecture acts as essentially a distributed reservation station, where instructions and data are matched as they both flow through the pipelines. The natural extension of this paradigm is to attempt to distribute ROB 16 around the pipeline. In one embodiment, ROB 16 is segmented and matching at various locations around the pipeline is used to track instructions and data. In one such embodiment, the only extra hardware needed to implement this scheme is a table to hold the register aliases and the addition of a field to the register file to hold the ROB entry which will eventually write the data back.

Figure 14A:
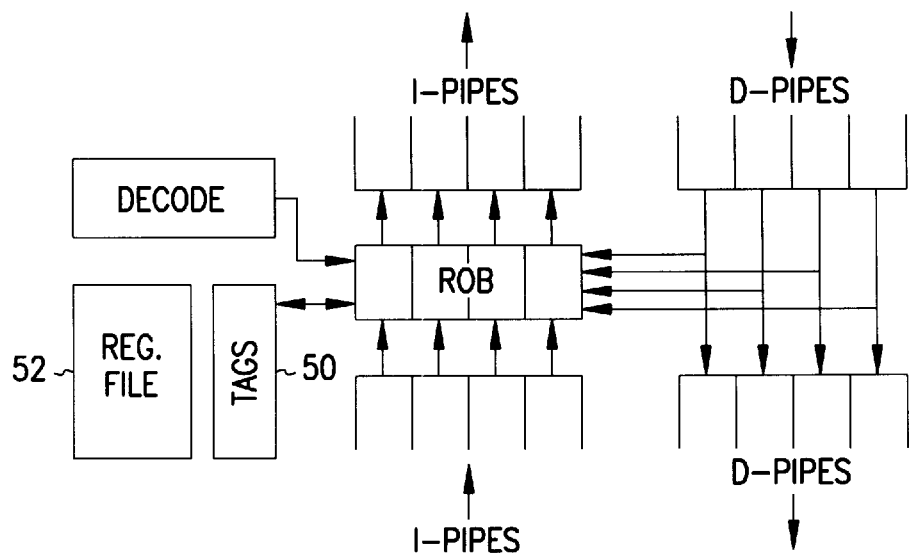
FIG. 14a illustrates a segmented reorder buffer which can be used in the system shown in FIG. 1.
Figure 14B:
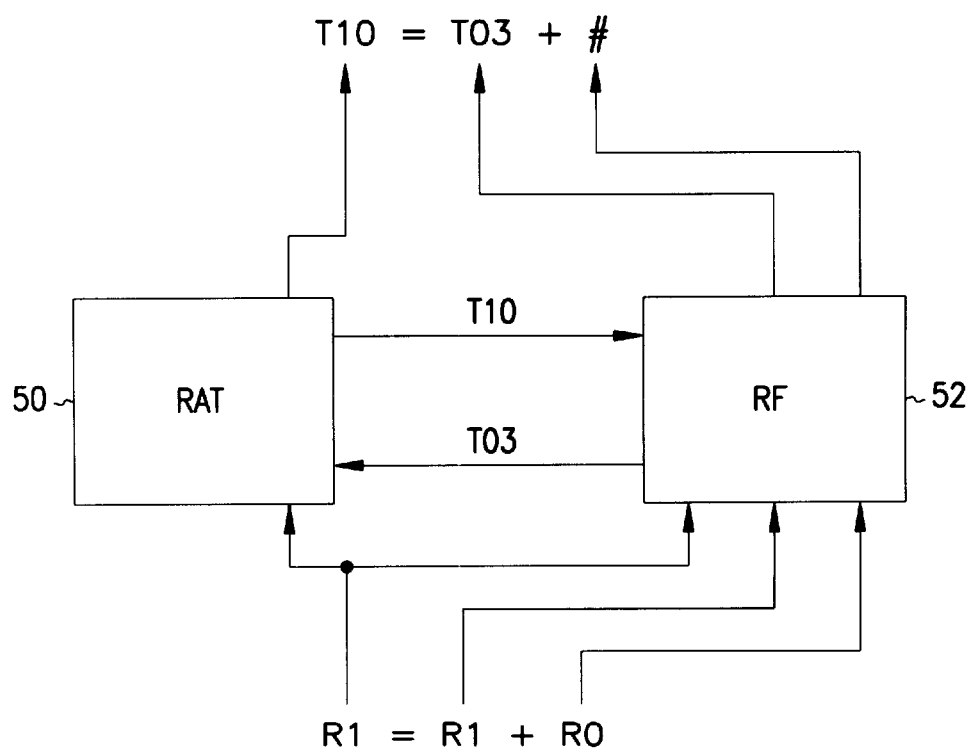
FIG. 14b illustrates one embodiment of an register alias table and a register file used to segment a reorder buffer.

A representative segmented ROB 16 is shown in FIG. 14*a*. The extra hardware needed is shown in FIG. 14*b*. In the embodiment shown in FIG. 14*b*, register alias table (RAT) 50 and the modified register file 52 control the matching. For this illustration, it is assumed that there are two instruction pipelines 12.1 and 12.2 and that ROB 16 can hold, in total, four instructions at any given time. In one embodiment, RAT 50 is organized as a circular buffer, with new entries being added at the head pointer and old entries being retired from the tail pointer. When the head and tail pointers point to the same location, RAT 50 is full, and can hold no more instructions until the oldest instruction completes and can be retired. The "pipe" field shows which instruction pipeline the instruction was dispatched into. The "register" field shows which register, in register file 52, that this instruction will write its results into when it completes. The "last" field points to the RAT entry which previously was going to write to the same register. This is used in case of an incorrectly speculated branch. The instructions after the branch must be removed from the pipeline and the RAT and RF must be returned to the state they were in before the branch occurred. The "last" field is used in this case so that RAT 50 does not need to be associatively searched. If this is the only instruction which is going to write to this register, this entry's own RAT number is put in the last field. The register file performs the same functions as a standard register file, with the exception of the addition of the "alias" field. The "alias" field holds the RAT entry which will eventually write into this register. This field is provided to allow the "last" field of the RAT to be updated by reading it directly from the register file.

FIGS. 15*a* and 15*b* show an example of how the RAT and RF together are used to process an instruction. In FIG. 15*a*, RAT 50 and RF 52 are shown in an initial state. They have only one outstanding instruction. Some instruction is in the pipeline and will eventually write to register R1. This instruction has been put into the instruction pipeline 0 and given the RAT tag of T03. The "0" in T03 indicates that the instruction is in instruction pipeline 0 and the "3" indicates that it has been put into the third RAT entry.

At this point, a new instruction needs to be issued to the pipeline. Assuming that this instruction performs the function R1=R1+R0 and there is room in instruction pipeline 1 for this instruction, the following actions occur. The Register file 52 is read to see what the values of R1 and R0 (the consumers) are. Since R0 is already valid, the actual numerical value is given out. R1 is to be processed by the first instruction and so that instruction's alias, T03, is given in the place of R1. This new instruction will eventually write its result to register R1. The head of RAT 50 is pointing to entry 0 and since this new instruction is going into pipeline number 1, the instruction is given the tag T10. At the same time, the old instruction's alias is read out of the RF and written into the "last" field of this instruction's entry. After being processed by RAT 50 and RF 52, the translated instruction looks like, T10=T03+#. This new instruction is launched into instruction pipeline 1. This entire lookup process was accomplished without making any associative memory accesses, therefore this step in the pipeline can be fast and not limit the performance of processor 10.

Figure 16A:
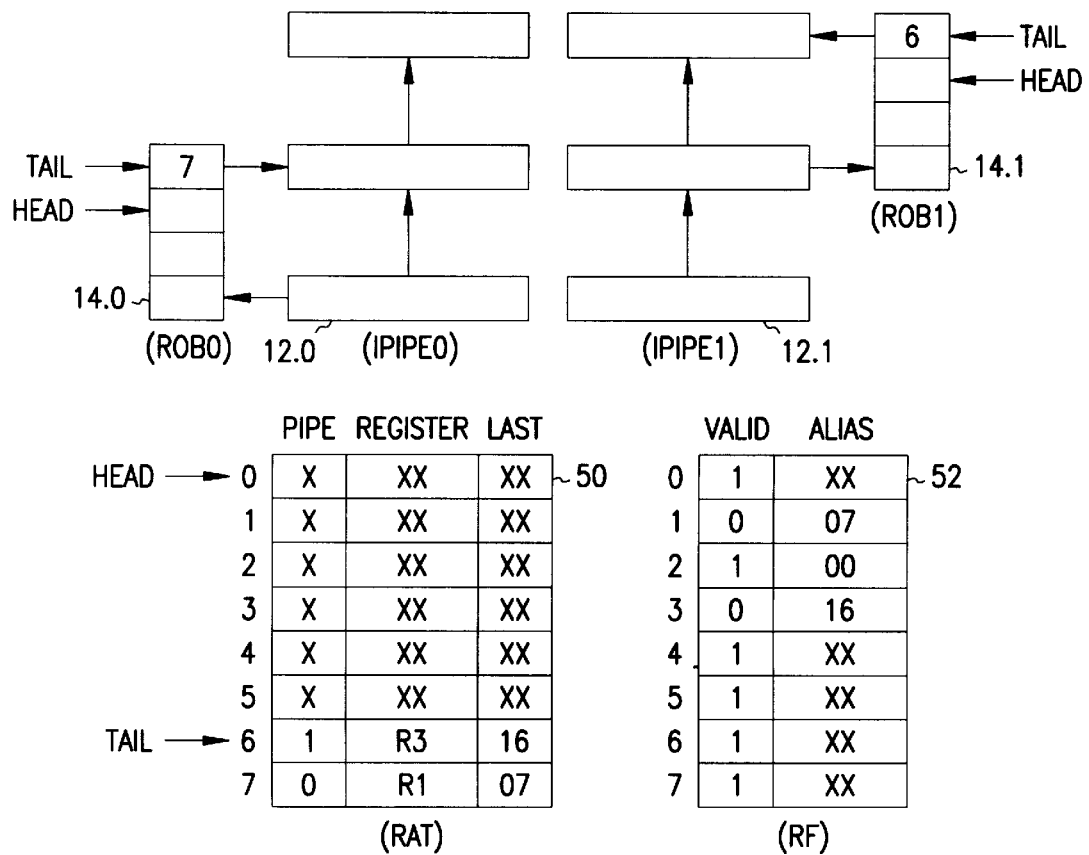
FIGS. 16a–16e provide an example of how a segmented reorder buffer can be used to service two instruction pipelines.
Figure 16B:
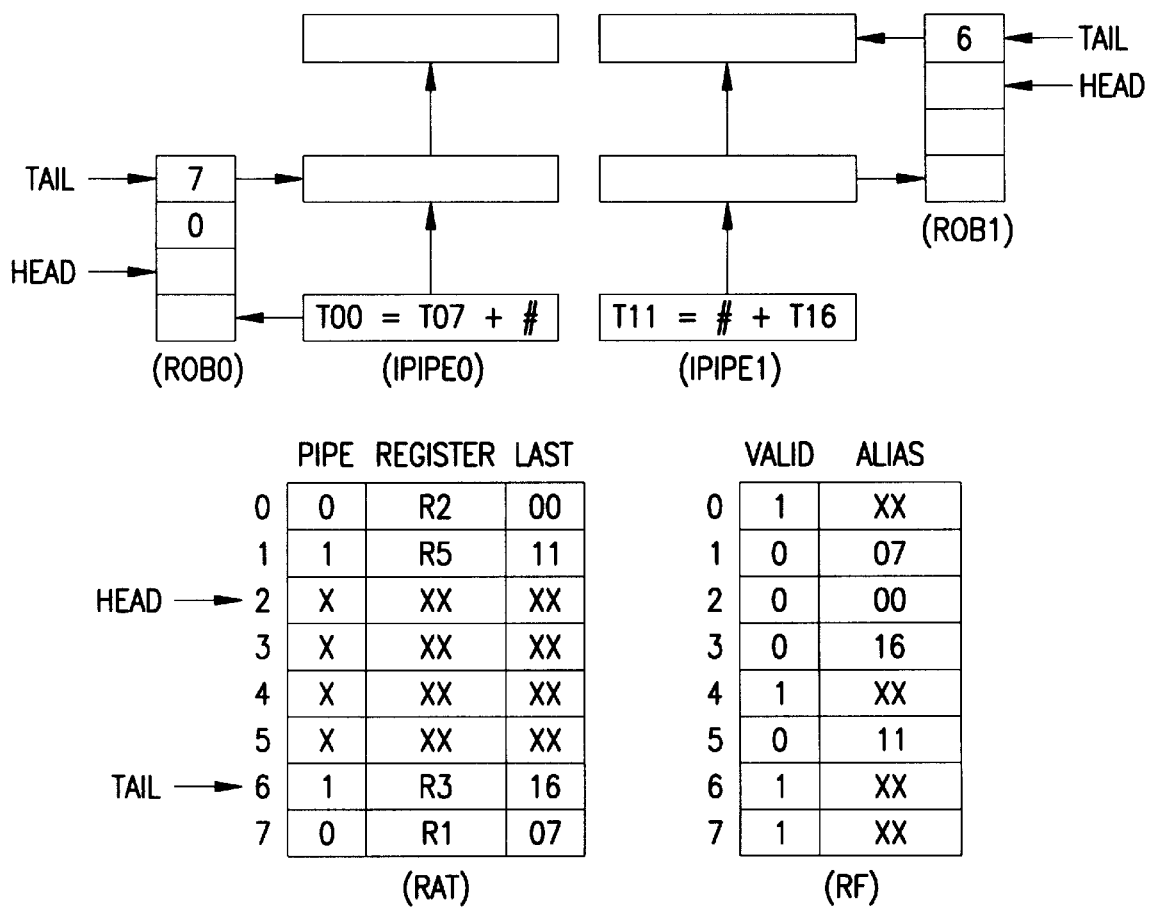

At this point, a short example (using FIGS. 16*a*–16*e*) may help to clarify just how this whole process allow the ROB to be broken up and still maintain consistent data across the individual ROBs. FIG. 16*a*, shows a small pipeline which will be used to step through an example. This example has two instruction pipelines, IPipe0 and IPipe1, each of them being three stages long. There are two ROB's ROB0 and ROB1, which hold four entries each as well as a RAT 50 which holds eight entries. At this starting point, two instructions are in the processor somewhere. One instruction has been dispatched to IPipe0 and will eventually write back to register R1. This instruction has RAT/ROB tag of T07. The other instruction has been dispatched to IPipe1 and will eventually write back to register R3. This instruction's RAT/ROB tag is T16. Notice that ROB0 has an entry for T07 and ROB1 has an entry for T16. ROB0 only holds entries for IPipe0. Similarly, ROB1 only holds entries for IPipe1. Since all instructions know which pipeline the instruction they are looking for were dispatched into, they also know which ROB will hold that instruction. In this way, the number of times an individual ROB needs to be accessed is reduced. If an instruction is looking for a result tagged T13 for example, it knows by definition that it doesn't have to bother checking any other ROB other than ROB1. In the next clock cycle, two instructions go through the RAT/RF renaming process. The first instruction, R2=R1+R0, will be dispatched to Ipipe0. The second instruction, R5=R4+R3, will be dispatched to Ipipe1. FIG. 16*b* shows the actions which occur to begin the processing of these instructions. Starting with the first instruction's operands, R1 and R0. These operands are read out of the register file, since R0 is already valid its value is given. The register R1 is going to be generated by the instruction which has tag T07, so that tag is given in place of R1. The head of the RAT points to entry number 0 and since the instruction is being issued to IPipe0, this instruction gets tag T00. This can be observed at register R2's location in the register file where the alias gets set to 00 as well as in entry 0 of the RAT itself. The second instruction, R5=R4+R3, occurs at the same time as the first instruction with the same actions occurring. The operands R4 and R3 get their values from RF 52. The values for R4 and R3 are the value in R4 and the tag T16 respectively. Since the second instruction is being issued to IPipe1 and the RAT's head pointer effectively points to entry 1, this instruction gets tag T11. The register file records that the instruction with tag T11 will eventually write to register R5. In the pipeline itself, ROB0 has seen the first instruction. It puts the instruction tag 0 into it's smaller ROB and updates its head pointer. The second instruction's ROB is located farther up in the pipeline, so ROB1 has not yet seen the instruction tagged T11. This completes the first clock cycle.

Figure 16C:
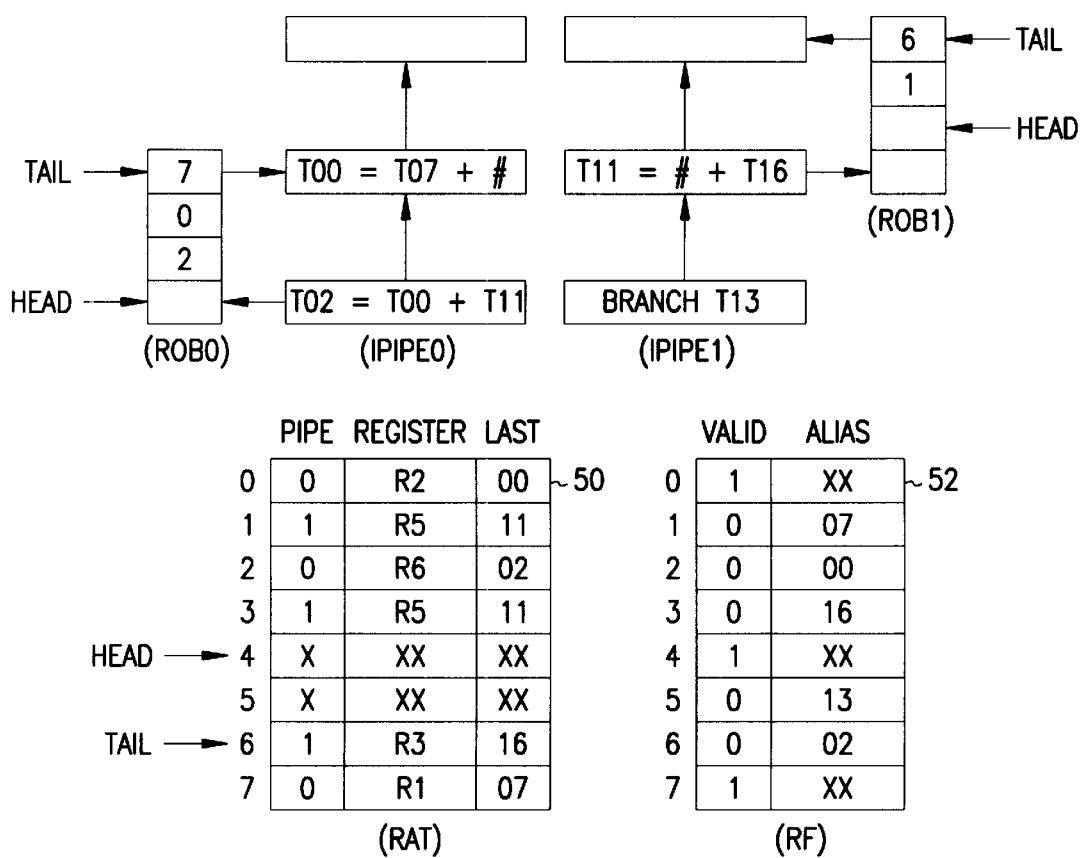

In the next clock cycle, two more instructions enter processor 10, FIG. 16c shows the state after they have been processed. The first instruction is another ADD operation performing the function R6=R2+R5, which will be issued to IPipe0. The second instruction is a branch which will be mispredicted, labeled Branch R5. At a later time, when this misprediction is realized, this branch and all other instructions issued after it will need to be removed from the processor and the state of all ROBs, the RAT, and the RF will need to be returned to their state from before the branch.

The first instruction needs to read R2 and R5 from the RF getting the tags of the instructions which will be generating these register's values as T00 and T11 respectively. This instruction is being issued to IPipe0 and the RAT's head pointer points to entry 2, so the generated tag for this instruction is T02. Since this instruction gets to its ROB in the first stage, ROB0 takes the tag and updates its head pointer. The second instruction, the branch, is assumed to not need to read any values from the RF, but for some reason it writes a value back to register R5. Even if the branch didn't have a result to write back, it still needs a RAT/ROB entry number so in this example, R5 is used. Since the branch is being issued to IPipe1 and the RAT's head pointer essentially points to entry number 3, the generated tag is T13. Since the branch, with tag T13, and the instruction with tag T11 are both writing to register R5, the "last" field is filled in appropriately. The branch's "last" field points to tag T11 as the instruction which was going to write to register R5 before. This is important because when the branch is removed later, this value will have to be replaced in the register file so that R5 will be updated by the instruction with tag T11. This will be explained in more detail later. As the second ADD, the one that will write to tag T11, has advanced a pipestage since the last clock cycle, it has now been written into ROB1.

Figure 16D:
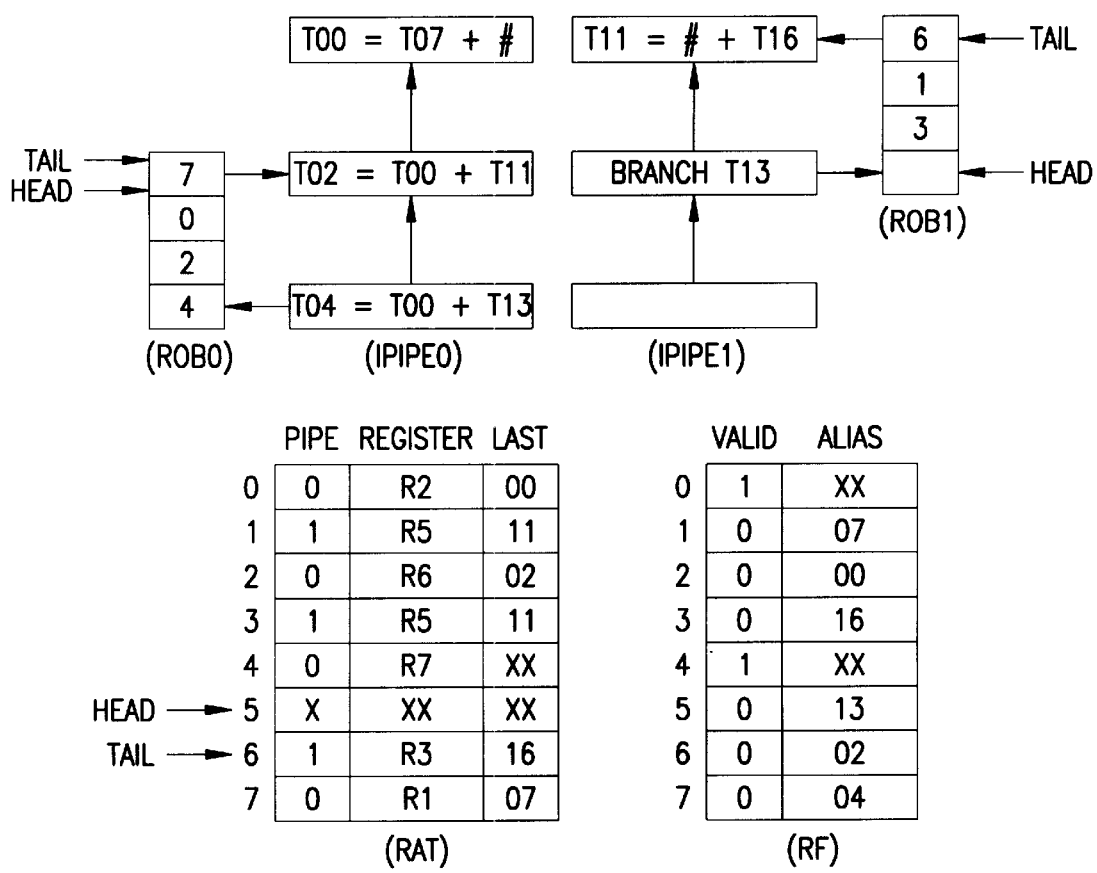

FIG. 16d shows the machines state after another ADD instruction, R7=R2+R5, enters processor 10 before the wrong branch has been detected. This instruction is in the shadow of the wrongly speculated branch and therefore should never have been executed. It enters processor 10 because this is a speculative architecture and most of the time the branch prediction guesses correctly. In the case where the branch prediction guesses correctly, no work was lost while the branch was being processed.

Unfortunately, in the incorrect prediction case, any actions caused by this instruction need to be undone. ROB 16 itself makes certain that the result of this instruction is never written back to permanent storage, but now RAT 50 and RF 52 have to clean up their tables when the branch gets resolved. For now, this instruction is treated as any other. It reads its operands R2 and R5 from the RF and gets the tags T00 and T13 respectively. This instruction is being issued to IPipe0 and the RAT's head pointer is at entry 4, so the generated tag is T04. ROB0 writes this instruction's tag into itself. At the same time all this has occurred, the branch instruction has moved up a pipestage and ROB1 has written the branch's tag into itself. At this point, it is assumed that the wrongly predicted branch has been discovered. To make things simpler, it is also assumed that all of the other instructions have not executed and are still in the pipeline as shown in FIG. 16d. The branch execution unit, which discovered the mistake, tells the RAT that the instruction with tag T13 was a wrong branch. The RAT now knows that all the instructions between entry 3 and its head should not have been in the pipeline and must be cleared. In this case, this amounts to removing entries 3 and 4 from the RAT. It sends a message to the individual segmented ROBs telling them to invalidate the instructions in that range. All that is left to do is put the register file back in order. To do this, it looks at the "last" field in the entries of the RAT that it is clearing. Entry four's "last" field points to itself, so register R7 is marked valid and the value contained in the RF is the correct value from before this instruction. Entry three's "last" field points to tag T11. By checking the RAT's entry 1, it is observed that this instruction has not yet written back. Since the instruction has not yet completed, the RF entry for R5 has its "alias" field set to tag T11 since its value will now be coming from that instruction. Register R5's valid bit is not set in this case. If the instruction with tag T11 had completed, the correct value would have already been written back to the RF, and the valid bit would need to be set.

Figure 16E:
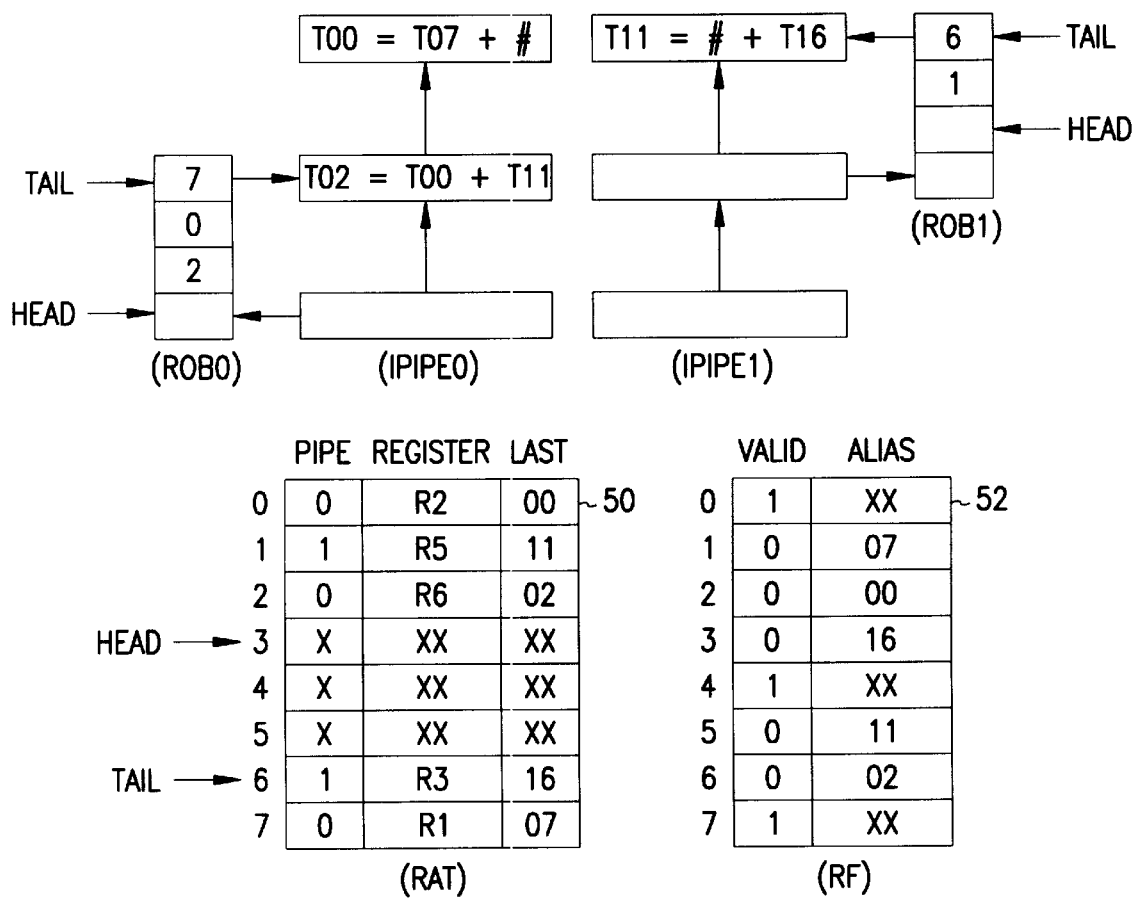

The tables are now back to the state they were in before the wrong branch and FIG. 16e shows the final state of the machine. As the remaining instructions complete, they are written back to the register file and removed from RAT 50. The instructions must be retired in the order in which they were issued to guard against interrupts or faults. In this manner, the machine state can be saved so that it can be restarted if necessary after performing whatever operation is required. This same mechanism is used to recover from incorrect branches, page faults, interrupts, and any other type of asynchronous event.

By segmenting the ROBs, the size of the individual ROBs have been reduced by an amount equal to the number of instruction pipelines. For example, a machine which originally had one 128 entry ROB with four instruction pipelines can now have four 32 entry ROBs. The segmented ROBs are still created with associative memory, but they are considerably smaller. When instructions are added to a ROB, they are added in order. At times when wrongly speculated instructions need to be removed, a start range and end range can be specified and since the entries are in order, they are easily found and removed. The number of read and write ports can be reduced also. Since each instruction pipeline has its own dedicated ROB, the individual ROBs only need to have one write port for the IPipes regardless of how many IPipes there are. It is possible that all of the instructions in all of the instruction pipes need to read from one particular ROB. This is not likely however since in the case of there being four instruction pipelines the odds of an operand being in a given ROB are 25%. This probability decreases as the number of IPipes increases. Since it is known ahead of time whether or not the operand could possibly be in the ROB, there is no need to query any other ROBs. The worst case for when there are four instruction pipelines is eight read ports from the instruction side. The worst case for when there are four result pipelines is still four write ports, but again the probability for each result is only 25% and it is known which ROB needs to be written to. So, for the worst case, the ROB needs 5 write ports and 8 read ports versus 8 write ports and 8 read ports for the non-segmented ROB. Assuming that the values are equally distributed amongst the four ROBs, the average number of reads per stage is 2. Since an instruction pipeline has an associated ROB, it always makes an access if there is an instruction in that pipestage. Correspondingly, the average number of writes is 1+(4*0.25)=2. If it is taken into account that not all of the stages are filled, that some of the operands have been read from register file 52, that some of the instructions have been processed on previous times of having passed ROB 16, and that not all instructions have two operands, the number of ports could possibly be lowered. The appropriate number of ports will depend on simulation runs for the type of benchmarks the architecture is being marketed to run. On top of all this, if on some cycles, there are not enough ports to perform all of the required actions the data can simply recycle around the pipeline and perform the necessary actions on the next pass of the ROB. This differs from the non-segmented case because in that case the ROB processed all instructions which entered the pipeline. In the segmented case, RAT 50 and RF 52 can process the instructions as they enter the pipeline since they are non-associative structures. Then, if the need arises, the ROB can take extra time and force the instruction to make another revolution of the pipeline before doing the processing since the issuing of instructions isn't being stalled. In general, if there are I instruction pipelines and r result pipelines (where I and r are assumed to be binary multiples), ROB 16 can be segmented into I pieces. Each segmented ROB 16.1—16.1 has the worst case number of ports as r+1 write ports and 2*I read ports. Assuming that the operands are distributed equally across the ROBs, the probability that a given operand is in a given ROB is 1/I. Therefore, the average number of reads for a given pipestage will be (2*)/I, or two. The average number of writes for a given pipestage will be 1+(r/I). Again, these numbers will be lower in practice since not all stages will be filled and not all instructions have two operands.

Segmented Reorder Buffers in Superscalar Processors

The distributed Re-Order Buffer (ROB) can be used in a superscalar architecture much the same way as it can in a Counterdataflow (CDF) architecture. In one CDF embodiment, the ROB is segmented into as many pieces as there are instruction pipelines (IPipes). In the example shown in FIG. 16a a CDF processor 10 has two instruction pipelines (IPipe0 and IPipe1) and an ROB 16 which is broken into two pieces (ROB0 and ROB1). Each piece has a corresponding Register Alias Table (RAT) and a corresponding Register File (RF).

All instructions entering the processor read the RAT and RF in parallel to find their sources. As noted above, in the example shown in FIG. 16a an instruction which executed R4=R1+R2 would read the RAT and RF for R1 and R2. The RF holds the value for R2 as indicated by register 2 being valid in the RF and the RAT's entry 7 will hold the value for R1. So, in this case, the RF would give the actual value for R2 and the RAT would give the tag T07 to indicate that the instruction which will return the value has tag 7 and was put into IPipe 0. If this instruction is to be put in Ipipe 1, the instruction would be given a tag of 10, with the 1 being for IPipe 1 and the 0 being for the next available entry in the RAT.

Figure 17:
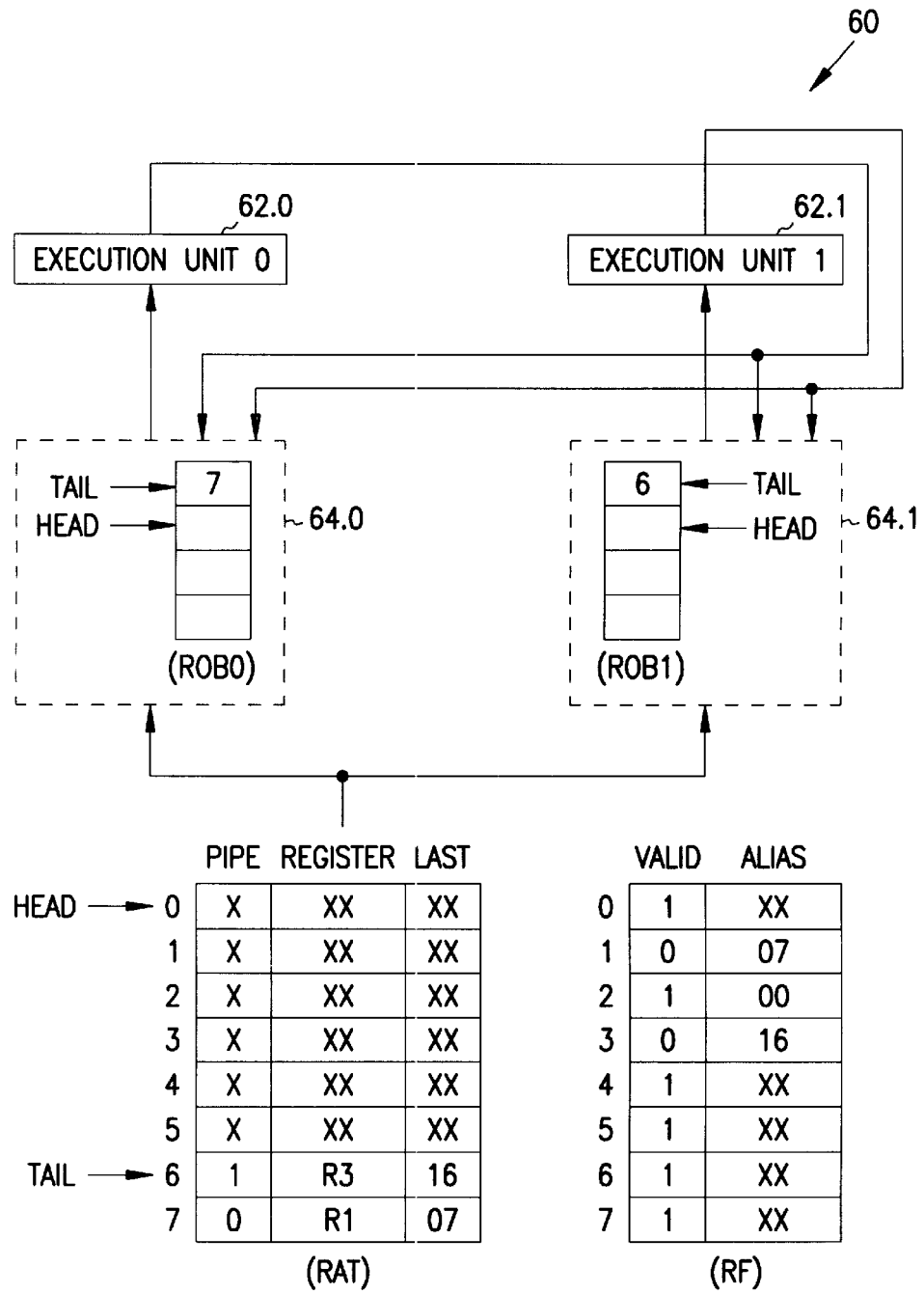
FIG. 17 illustrates the extension of a segmented reorder buffer to a more traditional processor architecture.

A simplescalar implementation works in a similar way. In a simplescalar embodiment, however, instead of segmenting the ROB based on the number of instruction pipelines 12, you would segment it based on the number of execution units. FIG. 17 shows the simplistic case of a simplescalar machine 60 with two execution units 62.0 and 62.1. For each execution unit 62, there is an associated reorder buffer 64. The segmented ROBs do not need to be the same size. Instead, in one embodiment the more frequently used execution units have larger reorder buffers than do the less frequently used units.

In one such embodiment, the flow of instructions into the machine is handled the same way as in the CDF implementation. An instruction enters the machine and checks the RAT and RF in parallel for its operands. The instruction is allocated an entry in the RAT and is dispatched to one of the segmented ROBs as a function of which ROBs are available, which execution units are available, and which execution units are able to execute this type of instruction. Once the instruction is allocated an entry in the segmented ROB, it executes as soon as its operands are available. Since the instructions have been tagged with the ROB/execution unit they were dispatched to, each ROB can monitor which tag is being written back and update the instructions it holds. This way, each ROB only needs one write port coming from its own execution unit 62.

Figure 18:
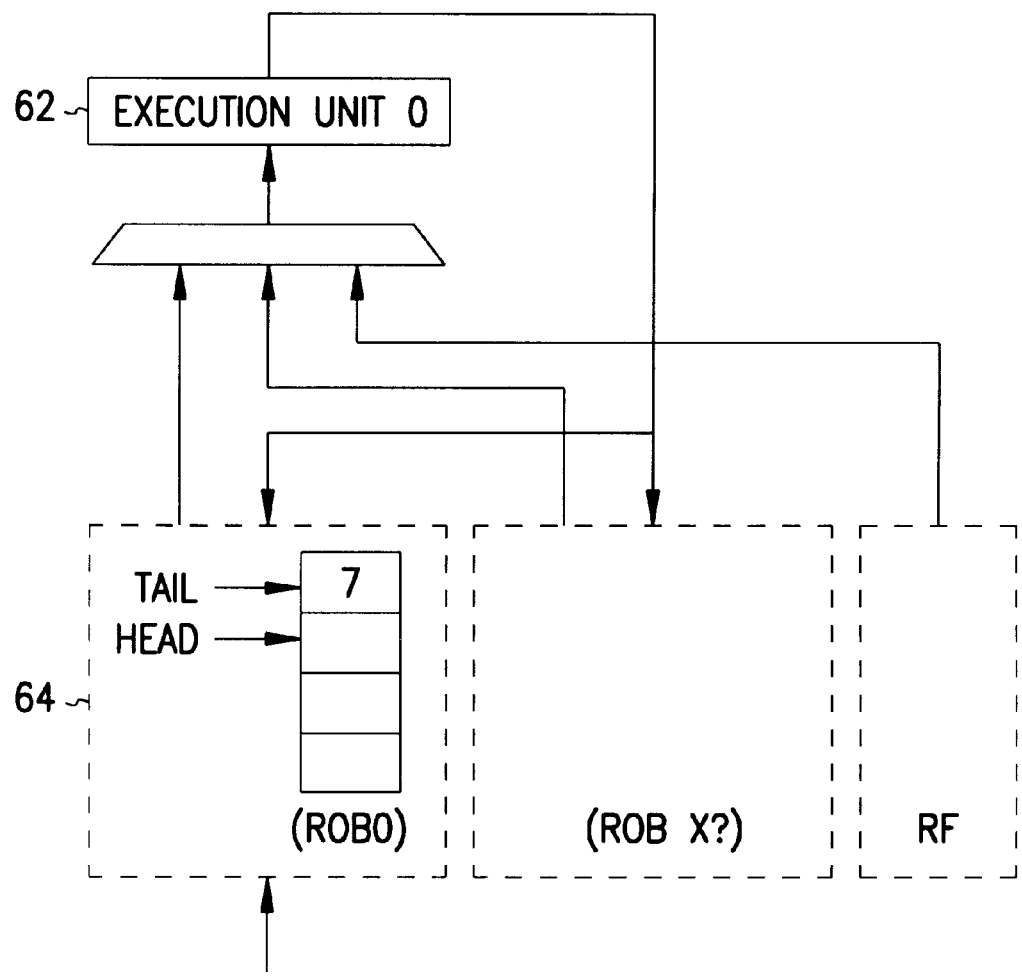
FIG. 18 illustrates the interactions between a segmented reorder buffer and its associated execution unit.

FIG. 18 shows the interactions between a segmented ROB 64 and its associated execution unit 62. As stated above, each of the ROBs 64 monitors the completed results being written back from the execution units to their ROB. The other ROBs do not need to do a complete write of this data. They are only interested in whether or not the result has been computed yet. Therefore, in one embodiment, only a valid bit for the result needs to be updated; the instructions in the ROB check their sources against this table to see if their operands are available. Once an instruction's operands have all been computed the instruction can now execute. To do this, it sends a read request to the various ROBs (and RF) that hold the data for its operands and multiplexes their values together to feed all the values into the execution unit. In this configuration, if there are n execution units and n segmented ROBs, there will be n read ports and two write ports per ROB 64.

In another embodiment, all completed results are written back directly to the RAT. In such an embodiment, each ROB 64 reads the RAT continuously to see if the operands had been computed yet. This would save on some complexity in the ROBs, but would add multiple write ports to the RAT. Since typically write ports are far more expensive than read ports, this approach may be less advantageous than the one described above.

Support for Hardware Multithreading

One of the problems facing high performance processor architects is that there is a limited amount of instruction level parallelism (ILP) available in a given program. To increase the amount of parallelism available, system designers have turned to hardware multithreading to hide latency of memory and provide additional parallelism since the threads have very little interaction between each other.

Figure 19:
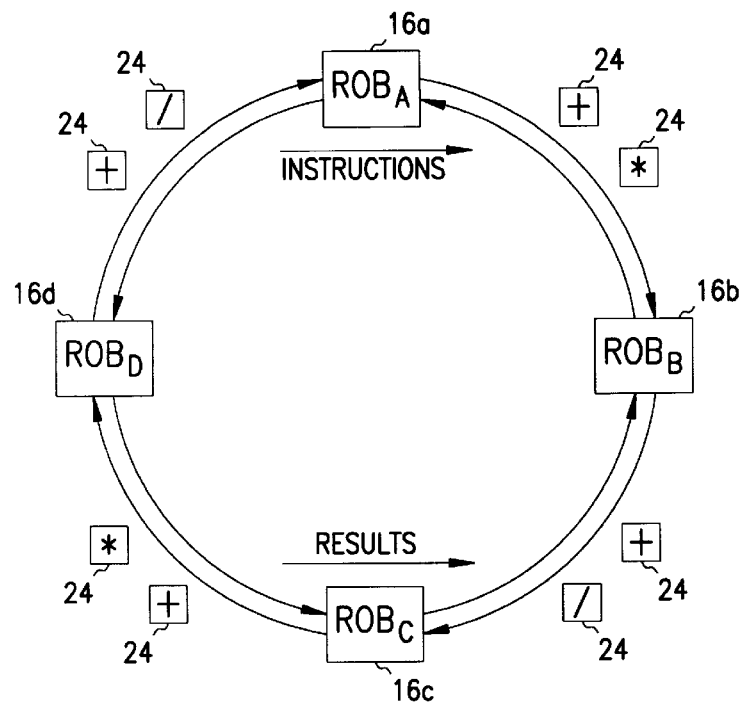
FIG. 19 illustrates one embodiment of a segmented reorder buffer used to support hardware multithreading.

One of the benefits of the present invention is that CDF supports multithreading with ease. Multithreading or shared resource multiprocessing (SRMP) is implemented quite naturally with CDF, as is illustrated in FIG. 19. With multithreading, the same execution units can be shared among instructions from all of the threads. Therefore, one version of such area expensive execution units as memory order buffers (MOBs) and floating point units can be used by all of the different threads. The only hardware that absolutely has to be duplicated are the ROBs 16a–d and the fetching logic.

Since, as seen in FIG. 6, the instruction pipeline utilization drops off the further away one gets from the fetch/decode area, letting each thread have its own ROB/Fetch/Decode (or perhaps a multiplexed fetch/decode) spaced evenly around pipelines 12 and 14 should provide excellent performance over more traditional designs. The reason is that the instructions that can be executed quickly (like ones based on immediate operands or on values computed far in the past) will be executed by the first execution unit 24 encountered, leaving holes in the pipeline 12 for the next thread to use. Functional units 24 close to a thread's ROB 16 will be used more by that thread than the other threads. The result is that while the threads still compete for resources in the processor, the 'prime resources' (i.e., resources close to ROB 16) are not the same for all the threads. Instead, each has its own set.

This is very different from a superscalar design where all threads may be constantly competing for exactly the same resources.

Since all matching is done based on tags, each ROB 16 can have its own unique tag which is appended to the normal instruction tag. The matching which occurs in pipeline 12 is based entirely on the tags. Since the instructions from different threads would have different tags and, therefore, would not match, the pipeline's logic will continue to do the same job of matching as before.

Figure 20:
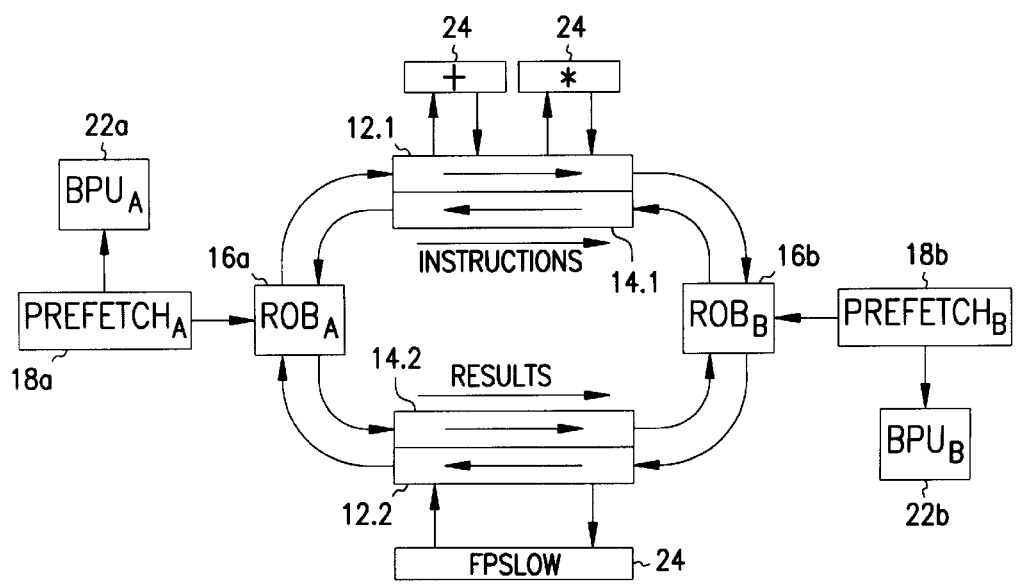
FIG. 20 illustrates one embodiment of a multithreaded counterdataflow processor which can handle two threads.
Figure 1:
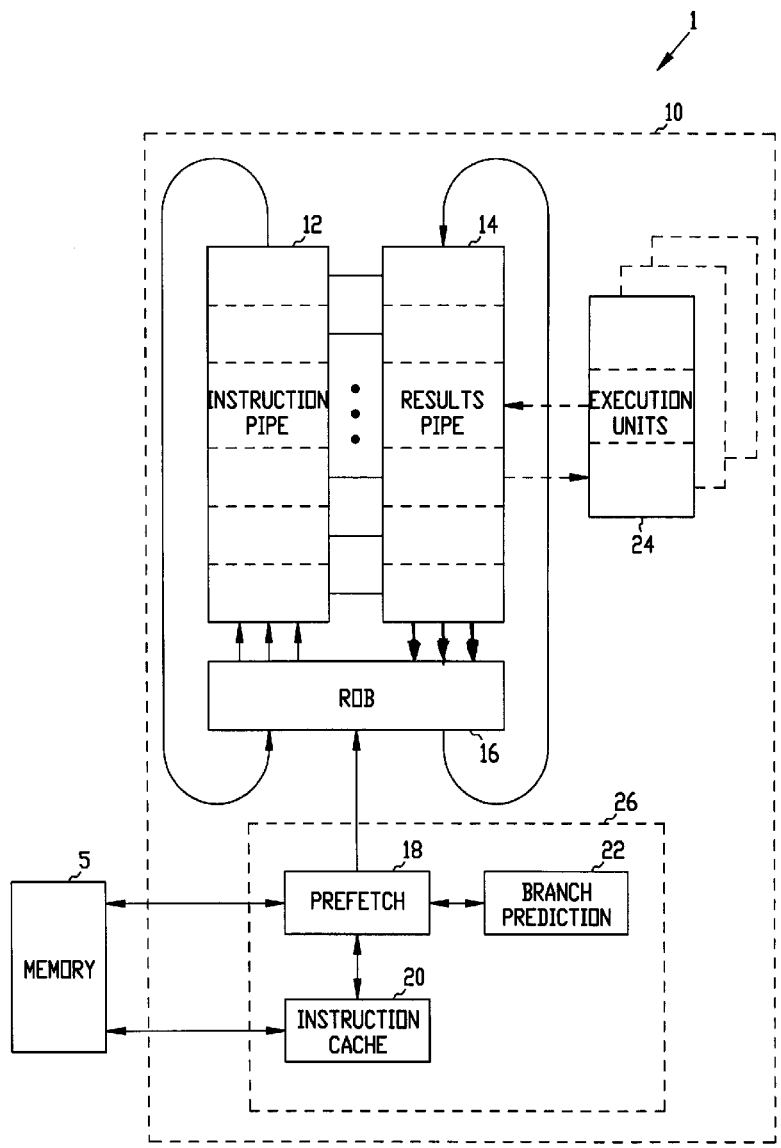

FIG. 20 shows one embodiment of a multithreaded CDF processor 10 which can handle two threads. The threads need to each have their own prefetch, branch prediction and ROB units. In addition, the branch execution units and memory units need to be thread aware or have separate instances for each thread. They may have separate instruction caches or a unified cache, but that is left up to the specific implementation. In one embodiment, the instructions from the individual threads act just as they do in the non-multithreaded CDF pipeline; the only difference is in the matching logic. When an instruction gets a ROB entry, an extra bit is added to the tag that the instruction is given based on which thread it is from. For the case where there are two threads, it can be assumed that thread A gets a 0 and thread B gets a 1. Now, instructions from both threads can be in the pipeline at the same time and the standard tag matching logic will take care of matching tags. Since the instructions from different threads are defined as having different tags they will never match.

There are several advantages to using multithreading. Some execution units 24 are area expensive and yet are not used very often. With multithreading, instructions from both threads can share these execution units 24. This lowers the overall cost of having the unit while increasing the amount of time the unit 24 gets used because both threads will use the same execution unit 24. Another advantage is that the same instruction and result matching logic can be shared by both threads, giving an effectively larger reservation station without doubling the number of stages. If one thread is not making forward progress for some reason, the other thread can use more of the resources and keep the overall throughput high. This throttling effect can be used when one thread needs to be replaced due to a page fault or other fault. While the one thread is being flushed and replaced, the other thread can use all of the available resources thereby somewhat offsetting the performance lost from the other thread. Multithreading in CDF is inherently scalable. By adding $\log_2 n$ bits, where n is the number of threads, to the tag a large number of threads can be supported. Of course, a linear number of ROBs 16, prefetch 18, and branch prediction units 22 need to be added, so the hardware needed does still increase substantially.

In summary, the real benefit of multithreading in CDF is that more parallelism is available to the scheduling core. Because the threads are independent, there are no data dependencies between them. This means that there will be more instructions available for execution at any point in time. This is very beneficial, since otherwise execution units might be idle waiting for data dependencies to be resolved.

The resource contention that remains could be managed more efficiently by assigning a priority to the instructions. In one embodiment, if one thread was speculating, it marks its instructions as being a lower priority than non-speculative instructions in order to allow the non-speculative instructions (even from another thread) to be executed first. In another embodiment, each time an instruction makes a loop around processor 10 its priority is increased to indicate that it should be executed soon (since there are probably a number of other instructions waiting for it to complete). In yet another embodiment, the compiler is designed to add 'hints' to processor 10 indicating the instructions that are in the critical path of a computation, or the instructions that have a large number of instructions dependent on them.

Data Speculation

The idea behind data speculation is that now that instructions are being speculatively executed the next logical step is to speculatively execute instructions based on guesses of what the data values will be. If some sort of an educated guess can be made, it is better to guess and hopefully perform useful work than to do nothing and definitely not perform useful work. Counterdataflow gracefully supports data speculation. In the embodiments discussed above, each result and instruction is in one of two different states, either valid or invalid. For data speculation, in one embodiment there are three states for each result and instruction: valid, invalid, and speculated. With speculated data, an instruction can launch to an execution unit 24 and produce a speculated result. In the normal case, once an instruction has been launched to an execution unit, it is removed from the pipeline. In cases where speculation is being performed, that instruction will, however, need to remain in the instruction pipeline. While the instruction is circulating, it is inspecting the result pipeline just as it usually does. In this case, however, it is watching for its operands to pass. If the operands pass and have the same value as was speculated, the same result is dispatched down the result pipeline, only this time not marked speculated but simply valid. The instruction is now free to be removed from the pipeline. If on the other hand, the speculation was incorrect, the instruction will take the correct value and, when an execution unit 24 is available, will launch, eventually creating the real result. In this way, speculated results can be created and used by subsequent instructions while maintaining correct operation. In one embodiment, ROB 16 never allows a speculated result to be retired to permanent storage. Either a new valid result is sent, or a confirmation that the speculated result is indeed the correct result is sent.

With all of these speculated results and instructions, some sort of control must be implemented or the pipelines will be flooded with only speculated values and no real work will be done. In one embodiment, as is noted above, instructions are assigned priorities. The priority decides which instructions get access to an execution unit 24. In one embodiment, if two instructions want to execute and one has real values while the other has speculated values, the real valued instruction gets priority.

One should note that speculation must be intelligently applied, only guessing when there is a reasonable probability of being correct or when nothing else would be executing anyway. Again, it is better to do something and hopefully accomplish some work than to do nothing and definitely accomplish nothing.

An interesting benefit of the CDF pipeline is that instruction reuse becomes straightforward. For example, if you wanted to do value prediction, simply make the prediction at some point, and allow instructions with predicted operands to execute (except for stores, of course) but not leave the pipeline. In one embodiment, the speculative instructions mark their results as speculative and put the results in the result pipeline. Then, when the actual value of the operand passes the instruction with a speculated consumer, the instruction checks to see if they are the same. In one such embodiment, this comparison is performed right there in pipeline 12 and the instruction can, if the speculation was correct, issue a producer that is not speculative. If, however, the speculation was incorrect, the instruction takes the correct value of the consumer and gets reexecuted.

In one data speculation embodiment of processor 10, each piece of data carries with it two bits. The first bit (V) indicates whether the data is valid; the second bit (P) indicates whether the data is predicted or actual. The bits can have the states shown in Table 1.

TABLE 1

| V | P | |
|---|---|---|
| 0 | 0 | the data is invalid |
| 0 | 1 | the prediction is incorrect (may not be used) |
| 1 | 0 | the data is known to be correct |
| 1 | 1 | predicted data |

In a speculative, dynamic execution processor, it is possible to predict the value of some operands and/or the outputs of some instructions in a way similar to branch prediction. Unfortunately it is very difficult to predict these values, so quick and efficient recovery is critical to good performance. To achieve good performance CDF processor 10 uses the following mechanism.

When a piece of data is predicted it is introduced into the machine as valid-predicted (V/P) data. Any instruction that sees this data and needs this particular piece of data will take it, and use it to speculatively produce a result. The result will also be marked as V/P. When the data's value is known (not predicted, but computed) it will be placed into the machine as valid/non-predicted (V/NP). Any instruction that sees this data and needs this particular piece of data will take it and act on it.

Consider the two possible inputs to an instruction's dependencies. The data could be predicted or not predicted. If it is not predicted, the instruction is executed and the output of the instruction is not considered predicted since it is based solely on non-predicted information. If one or more of the inputs to the instruction is predicted, the instruction can be allowed to speculatively execute (so long as it does not prevent older instructions from executing) as long as its output is marked as speculative. Subsequent instruction that depend on this instruction are then aware that the data is speculative. The instruction with speculative data is not removed from the scheduler. It must remain so that when the non-speculative data arrives it can be matched with the speculative data in the instruction to see if the prediction was correct. If the prediction was correct, the instruction reissues the results of its own action, but marked as valid/non-speculative so that subsequent dependent instructions will know that they acquired correct data and can retire. If the prediction was incorrect, then the instruction must update its input data with the correct data and get reexecuted to produce the correct output. Once an instruction has issued it's output as valid/non-speculative it can be removed from the "to be executed" instruction pool and, barring other restrictions, can be retired.

This approach is summarized in Table 2, where the action taken is shown to be a function of the state of the input or inputs to the instruction, the action the instruction is taking and the correctness of the prediction.

TABLE 2

| instruction inputs | instruction action | prediction correct ? | instruction action |
|---|---|---|---|
| V/P | exec -> V/P | Y | output V/NP |
| V/P | exec -> V/P | N | exec -> V/NP |
| V/P | nothing | Y/N | exec -> V/NP |
| V/NP | exec -> V/NP | (not predicted) | — |

This technique can be used in most implementations of dynamic dataflow machines, including superscalar and counterflow designs. It allows for multiple levels of prediction, and also provides a scalable, high-performance, uncomplicated recovery mechanism. It also allows for prediction of input values and also output values, so a variety of prediction mechanisms for can be used.

A simple example is shown in FIG. 21. In FIG. 21, the symbol "V/P" means data released that is valid, but speculative, "eV/P" means data released as a result of execution (but speculative), "eV/NP" means data released as a result of execution (but not speculative). "V/NP" means data released as a result of a prediction being correct and "ret" means the instruction retires. In one embodiment the times T0–T9 reflect clock cycles. In another embodiment the times T0–T9 reflect discrete time increments in an asynchronous architecture.

In FIG. 21, at time T0, the loads release speculative data. The first and third add instructions pick up the speculative data and proceed to execute with it (assume there is only a single adder). Notice that the independent instruction (the 5th add) is allowed to execute before the ones with speculative inputs. While this is not required for correctness, it is certainly required to prevent speculative execution from taking over the machine and preventing useful work. Instructions with speculative data should only be executed opportunisticly.

At time T2–T5 the instructions with speculative data execute, passing their speculative data to the dependent instructions. At T6 when the loads provide the real data, the first is right, the second is wrong, the first add releases a V/NP data to its dependent instructions and then retires, and the second add, upon see that its speculative data is correct releases its result as V/NP data and subsequently retires.

The third add sees the V/NP from the load and when it compares it to its speculative data realizes that it executed with incorrect data. It reexecutes and releases the new data as V/NP. In a similar way, the fourth add sees the result from the third add and reexecutes with the correct inputs and after releasing its results as V/NP retires. In this specific example we have saved two "time units" over a similar machine without data speculation.

Deep speculation and recovery from misspeculation is simple and elegant in the CDF processor. Entire data dependency trees can be speculated and reexecuted multiple times without expensive customized hardware to recover from a misprediction. This approach is similar to the way branch prediction occurs, except that instructions are available to be reused, similar to a trace cache.

There is, however a risk of overspeculation if one combines this technique with multithreading or some other mechanism where the speculated instructions could prevent other instructions that are more likely to be useful not to be issued or executed. However, if only data-speculated instructions are allowed to execute when there is nothing else to be done in a pipelined execution unit, then all that is lost is some of the result pipe bandwidth, a relatively inexpensive resource.

Mapping Complex Instructions to the Counterdataflow Processor

As processors grow in size and power, more complex instructions are added to even the most RISC-like instruction sets. For instance, the MMXTM instruction set designed by Intel Corporation adds SIMD instructions. In general, these more complex instructions are either dealt with by custom hardware or by breaking the instruction into RISC-like micro-ops and then executing the sequence of micro-ops In the CDF architecture, there are three ways to deal with instructions that can be broken down into smaller components. The first is simply to devote dedicated execution hardware in a sidepanel. This approach can, however, be expensive if the instruction is complex and cannot share its functionality with other instructions. The other two options rely on the characteristics of a CDF pipeline to operate.

One alternative is to actually issue the micro-ops separately into the pipeline. In one embodiment of such an approach, careful choice of tags allows all the micro-ops in an instruction to share the same ROB entry. If there is any parallelism in the instruction itself, it is exploited, and the execution units can be kept very simple, as all they need to execute are simple micro-ops. On the down side, a substantial amount of the pipe itself will be taken up by the instruction's micro-ops and communication within the instruction. If there is little or no parallelism within the instructions, then the best that can be hoped for is that the parallelism between instructions will be improved by having more, smaller operations active in pipeline 12 at once.

The other alternative to dedicated hardware is to have the instruction execute in multiple sidepanels. For example, in one embodiment a Multiply-Add first performs the multiply in a multi-cycle integer unit. Then the result is placed in the consumers array of the instruction and it launches into an single-cycle integer unit to execute the add. This has the advantage of not polluting the pipe with extra micro ops, but it means that if there is any parallelism within the instruction, it cannot be used.

Ultra-high Speed Clocking of the CDF Pipeline

Finally, there is the issue of ultra-high speed clocking of the pipeline. In one embodiment, segments of processor 10 operate at different speeds in order to optimize performance gains. This may be done, for example, if it is not be feasible to run an entire chip at a technology's fastest available speed due to power or heat reasons.

It can be advantageous to run one segment at a first clock speed and another segment at a faster clock speed. For instance, if instructions can be pulled from the cache at a rate of only 300 Mhz, it may not make sense to run the fetch unit at 600 Mhz. At the same time one may decide to run the execution core at 600 Mhz (because it usually takes more than one cycle to complete an instruction due to data dependencies and hazards).

CDF designs lend themselves very well to a multi-clocked scheme because the execution core has only a few links to the "outside world". Also, communication within the pipe is localized, so, since there is no need to transmit any information in the core a significant distance between clock cycles, it can support very high clock speeds. Moreover, because the pipe stages are all the same, they can be carefully optimized for excellent performance.

Consider the case where fetch/decode is running at half the speed of CDF core pipelines 12 and 14. So every other pipeline clock, new instructions may be added into the core. If the number of stages in pipeline 12 is relatively prime to the number of cycles it takes to fetch (e.g., one fetch per 2 pipeline cycles and 9 pipe stages) then the pipestage that the fetched tokens will be going into, are going to be the least recently fetched to location in the pipe, and thus the most probable to have places to accept the new instructions.

This concept can also be extended to Globally Asynchronous Locally Synchronous (GALS) systems with localized, independent clocks.

A counterdataflow pipeline processor can be used advantageously in a variety of computer systems. The counterdataflow processor is capable of high performance, scalable multithreading, and data speculation, all without exponentially increasing the amount of hardware necessary. Additionally, by distributing the reorder buffer one can increase the size and speed of access of the reorder buffer while reducing its complexity.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A processor, comprising:
   an instruction pipeline having a plurality of stages;
   a result pipeline having a plurality of stages;
   an execution unit connected to the instruction pipeline and the result pipeline, wherein the execution unit includes an operand input and a result output, wherein the operand input receives an operand from the instruction pipeline and wherein the execution unit transmits a result to the result output as a function of the operand received by the operand input; and
   a reorder buffer, wherein the reorder buffer supplies instructions and operands to the instruction pipeline and receives results from the result pipeline and wherein the instruction pipeline and the result pipeline wrap around the reorder buffer to create counter rotating queues.

2. The processor of claim 1, wherein the execution unit includes a plurality of stages, wherein each stage operates under control of a clock.

3. The processor of claim 1, wherein the execution unit is a wavefront processor.

4. The processor of claim 1, wherein the instruction pipeline is two instructions wide.

5. The processor of claim 1, wherein the result output is connected to the data pipeline and wherein the result output transmits a result to the result pipeline as a function of the operand received by the operand input.

6. The processor of claim 1, wherein the result output is connected to the instruction pipeline, wherein the result output transmits a result to the instruction pipeline as a function of the operand received by the operand input and wherein the instruction pipeline subsequently copies the result to the result pipeline.

7. The processor of claim 1, wherein the reorder buffer is implemented with non-associative memory.

8. The processor of claim 7, wherein each result must travel at least one half trip around the result pipeline after being recovered.

9. The processor of claim 8, wherein each result recovered into the result pipeline after a halfway point is marked as needing to pass the reorder buffer.

10. The processor of claim 8, wherein each result recovered into the result pipeline carries a tag identifying the instruction with which the result is associated.

11. The processor of claim 10, wherein the tag identifies the reorder buffer register associated with the instruction.

12. The processor of claim 1, wherein each result recovered into the result pipeline carries a tag identifying the instruction with which the result is associated.

13. The processor of claim 12, wherein the tag identifies the reorder buffer register associated with the instruction.

14. The processor of claim 1, wherein the processor further comprises:
   a cache, wherein the cache stores recently accessed data and instructions;
   an instruction prefetch unit; and
   a branch prediction unit connected to the instruction prefetch unit;
   wherein the reorder buffer receives an instruction from the instruction prefetch unit and launches the instruction, with its operands, down the instruction pipeline.

15. The processor of claim 1, wherein the reorder buffer uses non-associative memory.

16. The processor of claim 1, wherein the reorder buffer is distributed across two or more segments of the instruction pipeline.

17. The processor of claim 1, wherein the reorder buffer is configured as two segments, wherein each instruction in the instruction pipeline includes an instruction tag and wherein a reorder buffer tag is appended to each instruction tag, wherein the reorder buffer tag identifies the reorder buffer which issued the instruction.

18. The processor of claim 1, wherein each result in the result pipeline includes a tag identifying whether the result is valid and whether the result is a predicted value.

19. The processor of claim 1, wherein partial results are stored in a consumer array within the instruction pipeline.

20. A computer system comprising:
   memory; and
   a processor; wherein the processor includes:
      a cache connected to the memory, wherein the cache stores recently accessed data and instructions;
      an instruction prefetch unit;
      a branch prediction unit connected to the instruction prefetch unit;
      an instruction pipeline having a plurality of stages;
      a result pipeline having a plurality of stages;
      an execution unit connected to the instruction pipeline and the result pipeline, wherein the execution unit includes an operand input and a result output, wherein the operand input receives an operand from the instruction pipeline and wherein the result output transmits a result to the result pipeline as a function of the operand received by the operand input; and
      a reorder buffer, wherein the reorder buffer receives instructions from the instruction prefetch unit, supplies instructions and operands to the instruction pipeline and receives results from the result pipeline and wherein the instruction pipeline and the result pipeline wrap around the reorder buffer to create counter rotating queues.

21. The processor of claim 20, wherein the execution unit includes a plurality of stages, wherein each stage operates under control of a clock.

22. The processor of claim 20, wherein the execution unit is a wavefront processor.

23. The processor of claim 20, wherein the instruction pipeline is two instructions wide.

24. The processor of claim 20, wherein the result output is connected to the data pipeline and wherein the result output transmits a result to the result pipeline as a function of the operand received by the operand input.

25. The processor of claim 20, wherein the result output is connected to the instruction pipeline, wherein the result output transmits a result to the instruction pipeline as a function of the operand received by the operand input and wherein the instruction pipeline subsequently copies the result to the result pipeline.

26. The processor of claim 20, wherein the reorder buffer is implemented with non-associative memory.

27. The processor of claim 26, wherein each result must travel at least one half trip around the result pipeline after being recovered.

28. The processor of claim 27, wherein each result recovered into the result pipeline after a halfway point is marked as needing to pass the reorder buffer.

29. The processor of claim 27, wherein each result recovered into the result pipeline carries a tag identifying the instruction with which the result is associated.

30. The processor of claim 29, wherein the tag identifies the reorder buffer register associated with the instruction.

31. The processor of claim 20, wherein each result recovered into the result pipeline carries a tag identifying the instruction with which the result is associated.

32. The processor of claim 31, wherein the tag identifies the reorder buffer register associated with the instruction.

33. The processor of claim 20, wherein the processor further comprises:
   a cache, wherein the cache stores recently accessed data and instructions;
   an instruction prefetch unit; and
   a branch prediction unit connected to the instruction prefetch unit;
   wherein the reorder buffer receives an instruction from the instruction prefetch unit and launches the instruction, with its operands, down the instruction pipeline.

34. The processor of claim 20, wherein the reorder buffer uses non-associative memory.

35. The processor of claim 20, wherein the reorder buffer is distributed across two or more segments of the instruction pipeline.

36. The processor of claim 20, wherein the reorder buffer is configured as two segments, wherein each instruction in the instruction pipeline includes an instruction tag and wherein a reorder buffer tag is appended to each instruction tag, wherein the reorder buffer tag identifies the reorder buffer which issued the instruction.

37. The processor of claim 20, wherein each result in the result pipeline includes a tag identifying whether the result is valid and whether the result is a predicted value.

38. The processor of claim 20, wherein partial results are stored in a consumer array within the instruction pipeline.

* * * * *

UNITED STATES PATENT AND TRADEMARK OFFICE
CERTIFICATE OF CORRECTION

PATENT NO. : 6,163,839
DATED : December 19, 2000
INVENTOR(S) : Jänik et al.

It is certified that error appears in the above-identified patent and that said Letters Patent is hereby corrected as shown below:

In column 4, line 43, delete "an register" and insert --a register--, therefor.

In column 5, line 24, delete "a instruction" and insert --an instruction--, therefor.

In column 8, line 24, delete "15" after "floating".

In column 10, line 53, delete paragraph break after "times.".

In column 10, line 56, insert paragraph break after "type.)"

UNITED STATES PATENT AND TRADEMARK OFFICE
CERTIFICATE OF CORRECTION

PATENT NO. : 6,163,839
DATED : December 19, 2000
INVENTOR(S) : Janik et al.

Page 2 of 2

It is certified that error appears in the above-identified patent and that said Letters Patent is hereby corrected as shown below:

In column 12, line 44, delete "results" and insert --result--, therefor.

In column 15, line 2, delete paragraph break after "cycle.".

In column 15, line 46, delete paragraph break after "processed.".

In column 16, line 51, delete "firom" and insert --from--, therefor.

In column 17, line 21, delete "(2*)/I" and insert --(2*I)/I--, therefor.

In column 23, line 5, delete "MMXTM", and insert --MMX$^{TM}$--, therefor.

In column 23, line 9, insert --.-- after "micro-ops".

Signed and Sealed this

Twenty-ninth Day of May, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,163,839
DATED : December 19, 2000
INVENTOR(S) : Shih-Lien L. Lu, Kenneth J. Janik, Michael F. Miller It is certified that error appears in the above-identified patent and that said Letters Patent is hereby corrected as shown below:

Drawings,
Sheet 1, Fig. 1, the direction of the three arrows leading from the "ROB" to the "RESULTS PIPE" should be changed to three arrows leading from the "RESULTS PIPE" to the "ROB".

Signed and Sealed this

Fourteenth Day of September, 2004

JON W. DUDAS
*Director of the United States Patent and Trademark Office*